United States Patent [19]

Frank

[11] Patent Number: 4,491,947

[45] Date of Patent: Jan. 1, 1985

[54] TECHNIQUE FOR DYNAMIC SCHEDULING OF INTEGRATED CIRCUIT- AND PACKET-SWITCHING IN A MULTI-BEAM SS/TDMA SYSTEM

[75] Inventor: Amalie J. Frank, Chatham Township, Morris County, N.J.

[73] Assignee: AT&T Bell Laboratories, Murray Hill, N.J.

[21] Appl. No.: 499,771

[22] Filed: May 31, 1983

[51] Int. Cl.$^3$ .............................................. H04J 3/00
[52] U.S. Cl. ....................................... 370/94; 370/104
[58] Field of Search .................... 370/104, 94, 60, 86, 370/58, 63

[56] References Cited

U.S. PATENT DOCUMENTS

| | | | |
|---|---|---|---|
| 3,564,147 | 2/1971 | Puente et al. | 179/15 |
| 4,130,885 | 12/1978 | Dennis | 370/94 |
| 4,135,156 | 1/1979 | Sanders, Jr. et al. | 370/94 |
| 4,145,573 | 3/1979 | Arnold | 179/15 |
| 4,150,335 | 4/1979 | Cooperman | 325/4 |
| 4,232,266 | 11/1980 | Acampora | 370/79 |
| 4,413,337 | 11/1983 | Dauphin et al. | 370/94 |

OTHER PUBLICATIONS

IEEE Transactions on Communications, vol. COM-27, No. 10, "An Efficient SS/TDMA Time Slot Assignment Algorithm", Oct. 1979, Inukm, pp. 1449–1455.
ICC 1980 International Conference on Communications, "An Architecture for a Flexible Integrated Voice/Data Switch", Jun. 8–12, 1980, Ross et al., 21.6.1–21.6.5.
Proceedings of the IEEE, vol. 65, No. 3, "Analysis of a Switch Matrix for an SS/TDMA System", Mar. 1977, Ito et al., pp. 411–419.
Fourth International Conference on Digital Satellite Communications, "On the Efficacy of Traffic Assignment in Satellite-Switched TDMA Systems", Oct. 23–25, 1978, Wu, pp. 180–190.
IEEE Transactions on Communications, vol. COM-28, No. 3, "Multiple User Variable Rate Coding for TASI and Packet Transmission Systems", Mar. 1980, Cox et al., pp. 334–344.
ICC 1979 Conference Record, Boston, Mass, "A Combined Packet and Circuit-Switches Processing Satellite System", Jun. 10–14, 1979, Ozarow et al., pp. 24.51–24.55.

Primary Examiner—Douglas W. Olms
Assistant Examiner—Frank M. Scutch, III
Attorney, Agent, or Firm—Wendy W. Koba

[57] ABSTRACT

The present invention relates to a technique for dynamic scheduling of integrated circuit- and packet-switching in accordance with rapidly changing demand in a multibeam satellite switched, time division multiple accessed (SS/TDMA) environment. It is equally applicable to terrestrial communication systems, or more broadly to any type of centralized scheduling system involving arbitration of contention for resources among a plurality of users or equipments. All of the scheduling is performed onboard the satellite by a scheduler (6, 8) under the direction of a controller (4). The controller contains all the information related to both circuit requests ($[c_{ij}]$) and packet requests ($[p_{ij}]$) in matrix form, where it constructs these matrices from requests for service from each zone to each zone on a frame-by-frame or possibly less frequent basis, which it receives from the ground via an order-wire facility. The scheduler performs, for each of the slots of a frame, a least-choice assignment of the circuit requests contained in the controller. The scheduler then applies the same least-choice procedure to assign packets to switch positions not already assigned to the circuit traffic. The least-choice assignment yields efficient bandwidth and transponder utilization. Provision is also made for prioritizing or preempting both the circuit and packet traffic employing a movable-boundary or other protocols. At the completion of both the circuit and packet assignments for a particular slot, the controller broadcasts the slot schedule to the earth stations.

6 Claims, 17 Drawing Figures

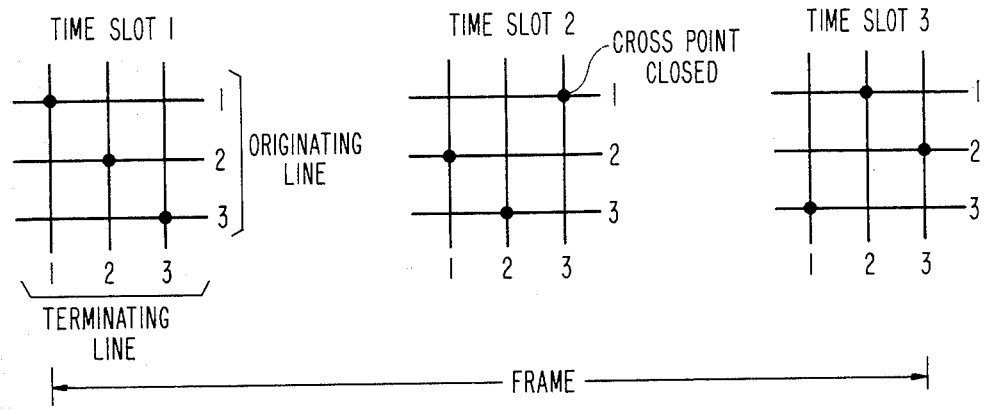
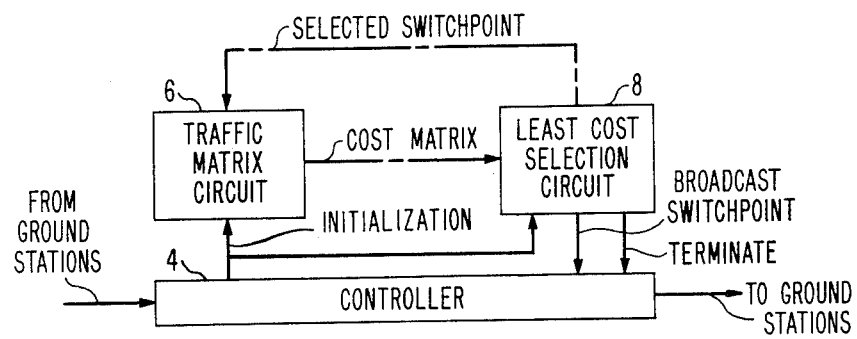

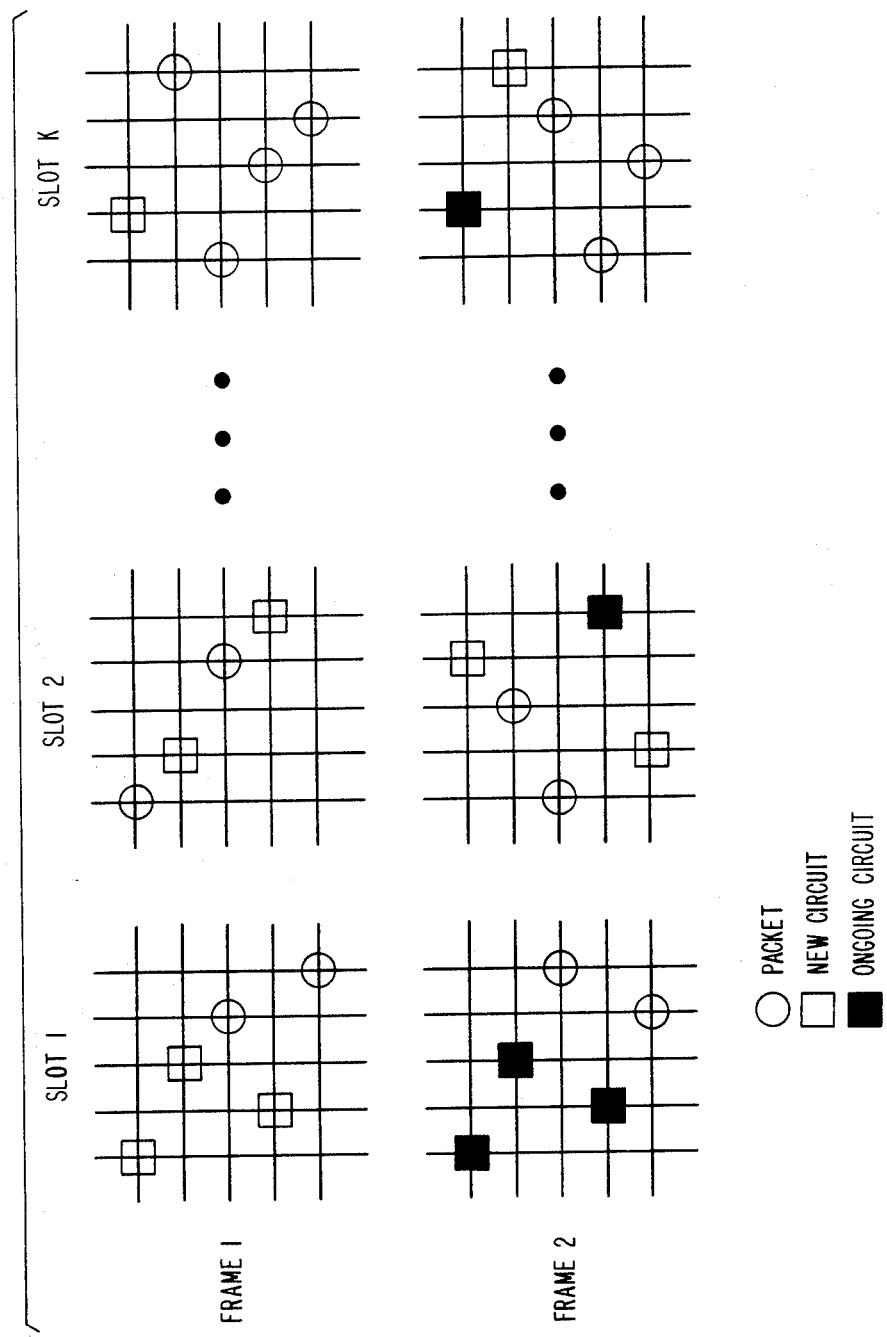

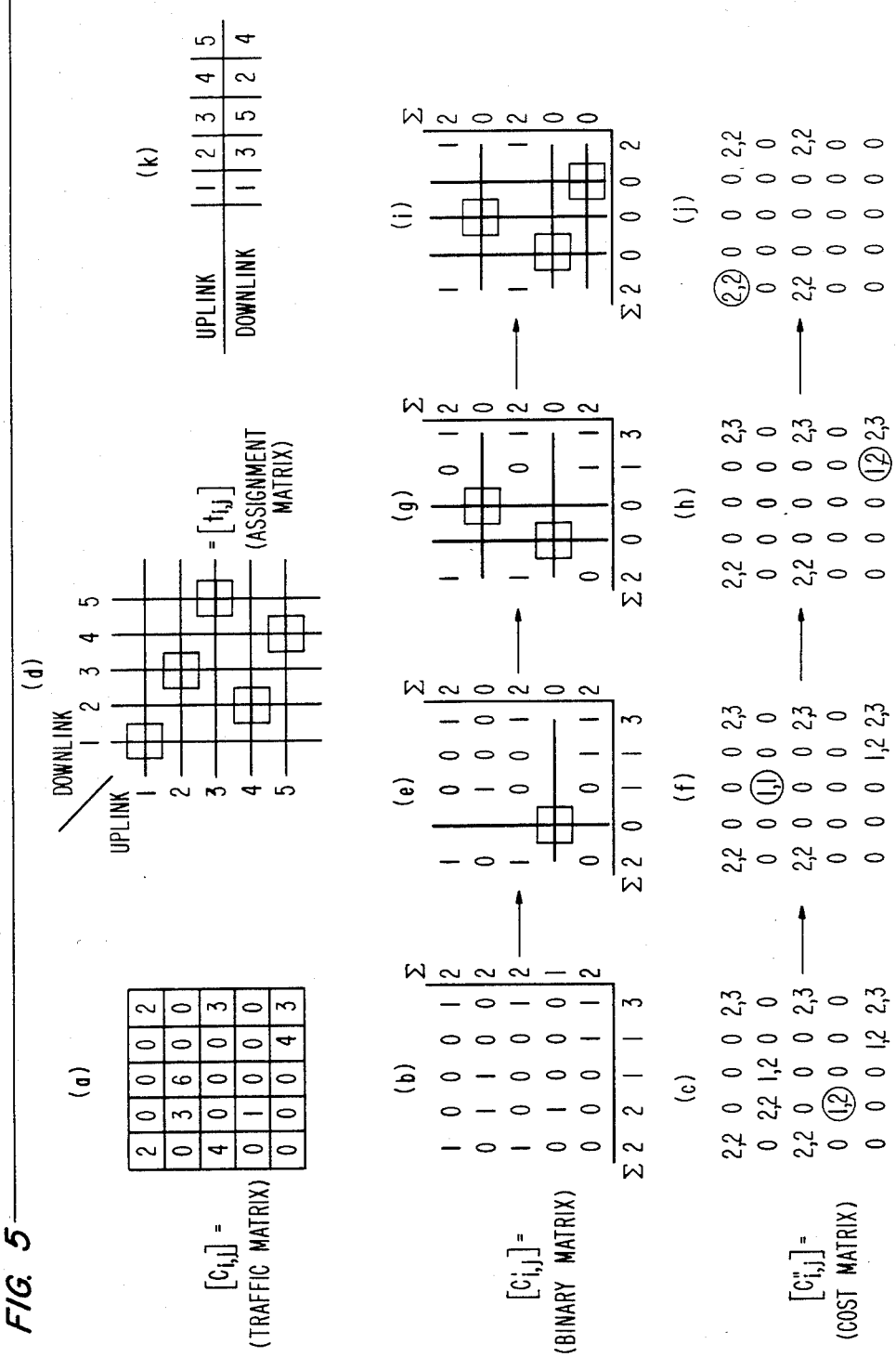

LEAST COST SELECTION CIRCUIT

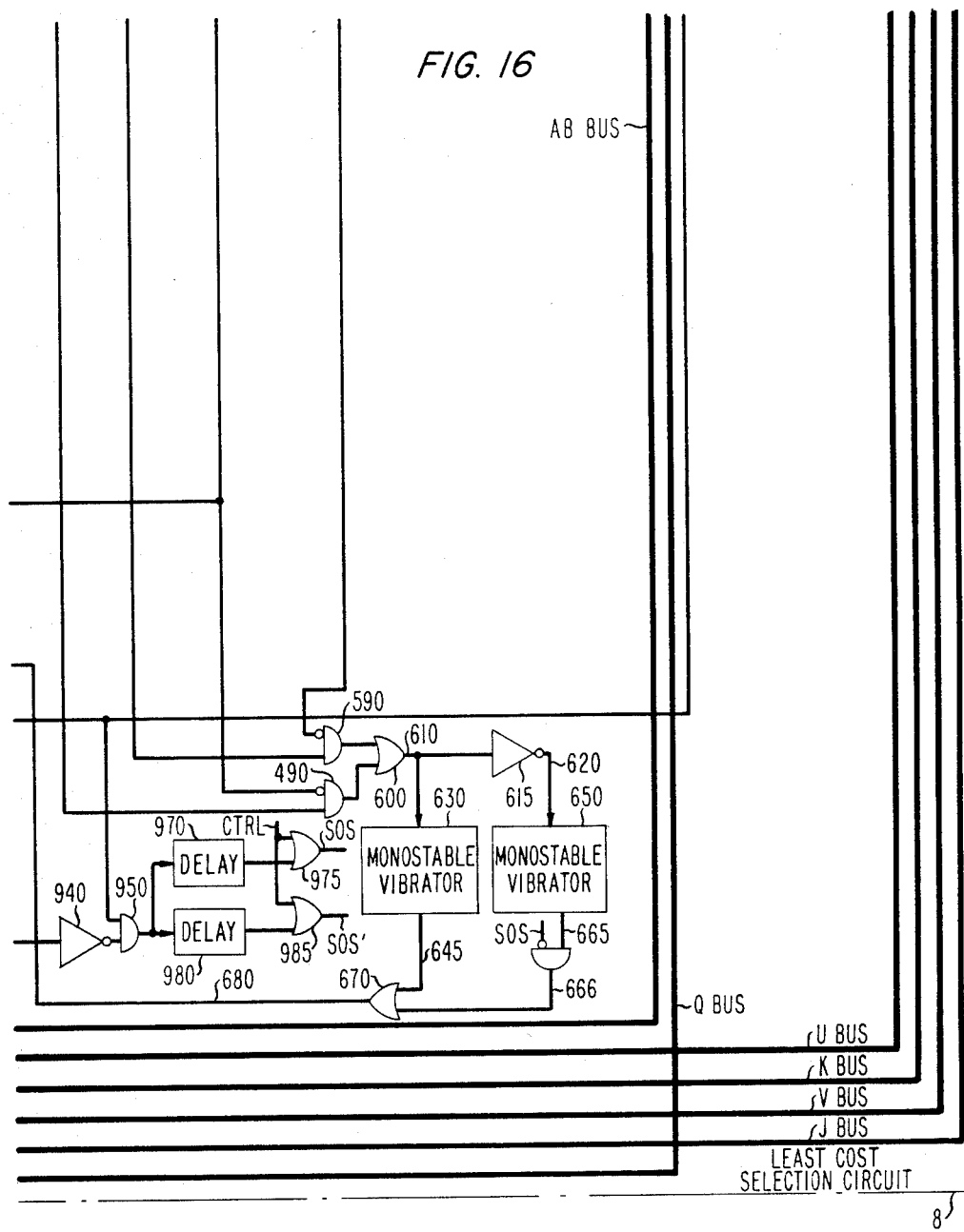

TECHNIQUE FOR DYNAMIC SCHEDULING OF INTEGRATED CIRCUIT- AND PACKET-SWITCHING IN A MULTI-BEAM SS/TDMA SYSTEM

BACKGROUND OF THE INVENTION

1. Field of the Invention

The present invention relates to a technique for the scheduling of dynamically changing integrated circuit- and packet-switching traffic in a multibeam satellite-switched time-division multiple accessed (SS/TDMA) system. It is equally applicable to terrestrial communication systems, or more broadly to any type of centralized scheduling system involving arbitration of contention for resources among a plurality of users or equipments. More particularly, it pertains to an onboard satellite technique which repetitively and rapidly schedules both circuit and packet traffic employing a least-choice procedure to ensure efficient bandwidth and transponder utilization. The technique is based on requests for service from each zone to each zone, for a frame at a time, which is received from the ground via an order-wire facility.

2. Description of the Prior Art

The early satellite communication system designs employed an area coverage beam which provided interconnections on either a time-division multiple access (TDMA) basis or a frequency-division multiple access (FDMA) basis. Such designs had the disadvantage of low antenna gain and frequency reuse only by the use of polarization techniques. More recent designs use multiple narrow-angle fixed spot beams and scanning beams with onboard satellite switching, thereby permitting frequency reuse, lower satellite transmitter power, high antenna gain, and scheduling flexibility. Several systems using area, fixed spot, and scanning beams are possible. In one of these, a relatively small number of small fixed spot beams illuminate widely separated, relatively small footprints, to avoid co-channel interference, but thereby forego area coverage. In a second system, a large number of somewhat overlapping fixed spot beams cover an entire area, but with means taken to reduce co-channel interference. In a third and fourth system, area coverage is achieved by adding to a small number of small spot beams either an area coverage beam, or a scanning beam which accesses the entire area, in each case requiring means to mitigate co-channel interference. A fifth system uses a single scanning beam. A sixth system uses several scanning beams, which additionally may be limited-scan beams, which individually are constrained to one of several parallel strips.

An article "Analysis of a Switch Matrix for an SS/TDMA System" by Y. Ito et al in Proceedings of the IEEE, Vol. 65, No. 3, March 1977 at pp. 411–419 discloses a technique which, given a traffic demand matrix, constructs optimum switch assignments for a successive set of time slots constituting a frame, and which serves all of the traffic in the traffic demand matrix. This technique was not intended for onboard usage, but was intended to be used but once, in designing the satellite. For this purpose, the traffic demand matrix used is a statistical one, wherein an element (j,k) of the matrix gives the average traffic from zone j to zone k per unit time. Given a particular traffic demand matrix, the technique determines a switch schedule, consisting of the connections to be made from indicated zones to indicated zones, in each of a set of successive time slots, such that all the traffic in the traffic matrix is served. The assignment is optimal in the sense that the schedule comprises the fewest number of time slots. Having determined the frame schedule, it is intended that the schedule be fixed, and in actual operation that it be repeated and unchanging from frame to frame. Accordingly, the technique is not optimal in the sense of responding to actual changing demand on a frame-by-frame basis in a dynamic system. Also, this approach requires relatively complex logic which is undesirable for onboard implementation. In addition, it requires lengthy operation times, which are not expected to meet the stringent time requirement of dynamic frame-by-frame scheduling. A somewhat faster version of this technique is discussed by W. W. Wu in Proceedings, Fourth International Conference on Digital Satellite Communications, October 1978, at pp. 180–190.

Another scheduling technique is disclosed in U.S. Pat. No. 4,232,266 issued to A. Acampora on Nov. 4, 1980. It also is based on a statistical traffic matrix, and is intended for one-time computation in designing the system. As with the previous methods described above, it is relatively complex and lengthy to operate, thereby limiting its use in an onboard frame-to-frame dynamically scheduled system.

T. E. Stern discusses studies on a dynamic scheduling system in the report, "Packet Scheduling Protocols for Multiple Beam Communication Satellites", Department of Electrical Engineering and Computer Science, Columbia University. This system handles packets only, and assumes an order-wire facility for transmitting to the satellite requests for connections in single time slots. The requests are queued in a list, and are used in a first-come-first-served basis to determine the switch closure pattern for the next time slot. The schedule is then transmitted back to the earth by means of the order-wire facility. This procedure is not optimal in that it does not close the maximum number of switchpoints per slot, but it is fast enough for onboard use. However, this study does not address integrated cicuit- and packet-switching, and in addition, for large systems, the energy expended in the order-wire data transmission and onboard management of single requests becomes excessive.

The major advantages of integrating both circuit-switched and packet-switched traffic in a single system are to achieve economy by sharing transmission and switching equipment, and more efficient bandwidth and transponder utilization. Other advantages include economy of scale in transmission leases, improved survivability, more peak capacity for priority use, and flexibility of providing services which combine human and synthesized voice, graphics, and data.

A technique for combining circuit traffic and packet traffic has been disclosed in the article "A Combined Packet- and Circuit-Switched Processing Satellite System" by L. H. Ozarow in ICC Conference Record, June 10–14, 1979, Boston, Ma., Vol. 3 at pp. 24.5.1–25.5.5. For this system, the uplink bandwidth is divided into two parts. The major part is a TDMA uplink for circuit traffic. The remaining part is divided into a number of FDMA uplinks, which are randomly accessed by the packets. Non-colliding packets are queued onboard the satellite. The downlink consists of a single TDM channel. Onboard processing stuffs packets into downlink slots not used by circuits. However, the disclosed system is limited to a single downlink beam implementation since it assumes that each packet user can monitor the downlink to determine if a sent package has collided, and if so, to retransmit the packet.

The problem, therefore, remaining in the prior art is to provide a method of scheduling both circuit and packet traffic in a multibeam SS/TDMA environment with a superimposed frame structure, which provides efficient bandwidth and transponder utilization, and which operates within the time constraints of dynamic scheduling, and which has simple logic attractive for onboard implementation.

SUMMARY OF THE INVENTION

The foregoing problem has been solved in accordance with the present invention which provides a technique for scheduling of dynamically changing integrated circuit- and packet-switching traffic in a multibeam SS/TDMA environment, and more particularly, to an onboard satellite technique which repetitively and rapidly schedules both circuit and packet traffic employing a least-choice procedure to insure efficient bandwidth and transponder utilization. The technique is based on requests for service from each zone to each zone, for a frame at a time, which is received from the ground via an order-wire facility.

It is an aspect of the present invention to provide a scheduling technique for both circuits and packets which is capable of efficient hardware implementation, and which operates with due speed, thereby increasing the processing throughput of the onboard scheduling.

It is another aspect of the present invention to provide a technique for achieving the integrated scheduling of both circuits and packets by means of onboard processing for considerably reducing the order-wire delay since an onboard satellite scheduler incurs only one uplink propagation delay to receive the traffic demand and one downlink propagation delay to broadcast the schedule. An earth station scheduler, however, requires double this overall delay, resulting from one uplink transmission to receive the traffic demand, one downlink transmission to relay the traffic demand to the earth station, one uplink transmission to send the schedule to the satellite, and one downlink transmission to broadcast the schedule.

Yet another aspect of the present invention is to provide a technique which permits the number of active transponders employed in the satellite system to be less than the number of spot beams, if desired.

It is a further aspect of the present invention to provide a method of scheduling both circuits and packets which is capable of prioritizing and preempting both the circuit and the packet traffic, employing a movable boundary and other protocols.

It is to be understood that although the present invention is discussed in terms of an on-board satellite switch, the technique of the present invention is equally applicable to terrestrial communications systems as, for example, self-contained or local area switching systems, or in broadest application, to any type of centralized scheduling system involving arbitration of contention for resources among a plurality of users or equipments.

Other and further aspects of the present invention will become apparent during the course of the following description and by reference to the accompanying drawings.

BRIEF DESCRIPTION OF THE DRAWINGS

Referring now to the drawings, where like numerals represent like parts in several views:

FIG. 1 illustrates an exemplary frame of an SS/TDMA system comprising three time slots wherein a fixed switching assignment is employed;

FIG. 2 illustrates an exemplary traffic matrix for a four zone communication network;

FIG. 3 illustrates an exemplary assignment of the traffic illustrated in FIG. 2 in an SS/TDMA environment comprising four transponders;

FIG. 4 illustrates the results of the scheduling process of the present invention for two frames of K time slots;

FIG. 5 illustrates the scheduling process of the present invention for an exemplary time slot of a 5×5 switch matrix;

FIG. 6 illustrates an exemplary onboard satellite switching system capable of performing the process of the present invention;

FIGS. 9-17 illustrate an exemplary least cost selection circuit for use in the exemplary onboard satellite switching system illustrated in FIG. 6.

DETAILED DESCRIPTION

Figure 7:
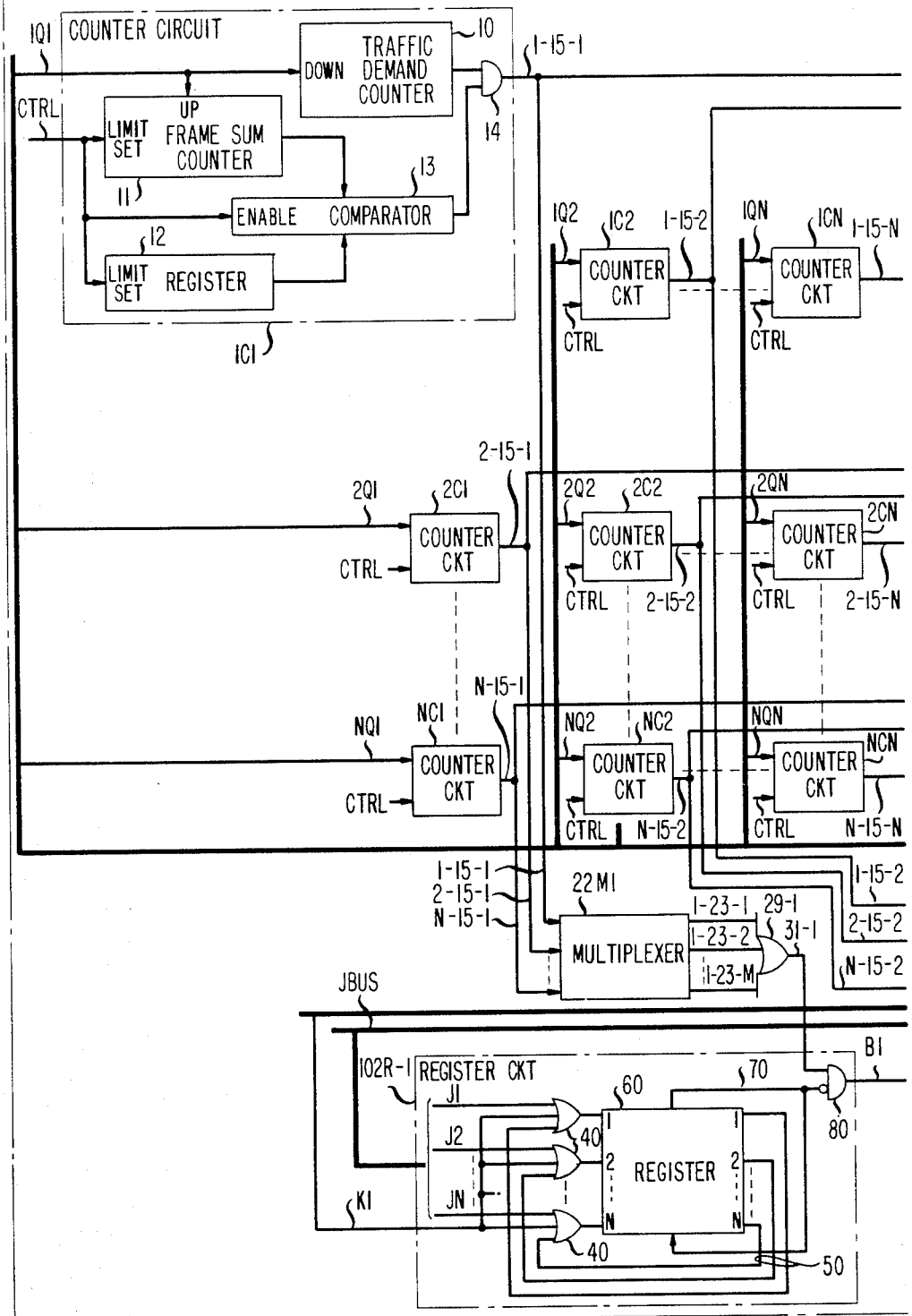
FIGS. 7 and 8 illustrate an exemplary traffic matrix circuit for use in the exemplary onboard satellite switching system illustrated in FIG. 6.

As is well known in the art, a TDMA frame consists of a plurality of sequential time slots, each time slot representing one unit of traffic to be exchanged between a transmitting and a receiving ground zone assigned thereto. The time slots in each frame sequence are selectively assigned to various paired transmitting and receiving ground zone combinations dependent on the traffic requirement therebetween. The time slot assignment may be represented by an N×N switch matrix where N is the number of separate ground zones. The simplest schedule changes the switch matrix closure configuration each time slot according to a fixed sequence, such that in one frame, each uplink is connected to each downlink the same amount of time. FIG. 1 shows a simple example of this scheduling for a 3×3 switch, with a frame of three time slots, denoted 1, 2 and 3, respectively. The separate rows of each switch matrix are associated with a separate one of three uplinks, each originating at one of three separate ground zones. Likewise, the three columns of each switch matrix are associated in a one-to-one relationship with the three downlinks. In time slot 1, each separate ground zone is in communication with itself, that is, the uplink from zone 1 is connected to the downlink of zone 1, the uplink from zone 2 to the downlink of zone 2, and likewise the uplink from zone 3 is connected to the downlink of zone 3. At the completion of the predetermined time duration of slot 1, the switch configuration of time slot 2 is formed, where as shown in FIG. 1, the uplink of zone 1 is connected to the downlink of zone 3, the uplink of zone 2 to the downlink of zone 1, and lastly, the uplink of zone 3 is connected to the downlink of zone 2. Finally, for time slot 3, uplink traffic from zone 1 is connected to the downlink of zone 2, the uplink from zone 2 to the downlink of zone 3, and the uplink traffic from zone 3 is connected to the downlink of zone 1. By repeating this set of three time slots 1, 2 and 3 in each subsequent frame, an established traffic pattern emerges wherein each zone is connected with all the zones, including itself, for equal periods of time.

This scheduling process, however, is inefficient where the zone-to-zone traffic is unequal. To accommodate unequal traffic, the frame may be adjusted to include more time slots where, for example, the configuration of slot 1 may occur twice per frame, slot 2 four times per frame, and slot 3 three times per frame. More generally, a traffic demand matrix $[t_{i,j}]$ may be formed where an individual element (i,j) contains the traffic demand from zone i to zone j in packets or circuits per unit time. Based on this data, it is possible to construct optimum switch assignments for a successive set of time slots constituting a frame which services all of the traffic in the traffic matrix. An exemplary traffic matrix for a four zone communication network is illustrated in FIG. 2, and an exemplary assignment of this traffic in a satellite-switched TDMA environment comprising four transponders is shown in FIG. 3. As previously discussed, this approach uses repetitive application of a fixed schedule, which is not optimum for a dynamically changing system.

Therefore, the primary motivation in integrating circuit- and packet-switching in a single communication system in accordance with the present invention is to achieve both economy by sharing transmission and switching equipment, and more efficient bandwidth and transponder utilization by means of dynamic scheduling. The crucial element of the present invention is the scheduling procedure, incorporating integrated circuit- and packet-switching on a frame-by-frame basis. The remainder of the present discussion will focus on how this procedure is accomplished, where it will be assumed that the scheduling function is performed by a "scheduler" under the direction of a "controller", where both are located onboard a satellite.

FIG. 4 illustrates the results of the scheduling process of the present invention for two frames of K slots, each for a 5×5 switch. In each slot new circuits are assigned first, and then packets are assigned, by the process to be described in detail hereinafter. Slot 1 in frame 1 shows three new circuits, illustrated by squares, and two packets, illustrated by circles. These three circuits are assumed ongoing in the corresponding slot 1 of each succeeding frame until the end of the call. Thus, these three crosspoints associated with the circuit traffic are shown closed (blackened) in slot 1 of frame 2, which also shows two packets. In slot 2, frame 1, there are two new circuits and two packets, but only one of the circuits is shown ongoing in slot 2, frame 2, indicating that the other circuit is no longer ongoing and has disconnected. Slot K of frame 1 contains only one circuit and four packets, where the circuit is shown ongoing in slot K, frame 2. Since packet traffic by definition never extends beyond the time period allotted to a particular slot, all four packet assignment locations of slot K, frame 1 are available for either new circuit or packet assignments in slot K of frame 2. In some cases, high priority, or dedicated, packet assignments may exist, where these may be recognized by the controller and assigned before the circuit assignment procedure is initiated.

The scheduling procedure of the present invention is performed on a slot-by-slot basis, where the "scheduler" has available to it the current traffic demand matrix (or simply the traffic matrix) of new circuit requests, denoted $[c_{i,j}]$, the current traffic matrix of new and queued packet requests, denoted $[p_{i,j}]$, and the identity of ongoing circuits assigned previously, but not yet terminated. Each current matrix, as will be described in detail hereinafter, is the matrix at the beginning of the frame, less the assignments made in the previous slots in the frame. The process of the present invention may be performed on any size N×N switch matrix, where FIG. 5 illustrates in detail the scheduling process of the present invention for the circuits for an exemplary time slot of a 5×5 switch matrix, FIG. 5(a) illustrating the new circuit traffic matrix $[c_{i,j}]$ to be employed in the following example. To initiate the procedure, a binary traffic matrix (or simply binary matrix), denoted $[c'_{i,j}]$ and shown in matrix (b), is formed by setting to the value of one each non-zero element of matrix (a), other than those elements in a row or column of an ongoing circuit for which zeroes are entered. An ongoing circuit is defined as one which was assigned in a previous frame and which has not yet terminated, or was newly assigned in the current frame. For the purposes of discussion, the example shown in FIG. 5 is assumed to have no ongoing circuits assigned in previous frames. The row sums and the column sums are also shown in FIG. 5(b).

In association with the least-choice method, an optimum schedule is one which specifies the maximum possible number of switchpoint closures, thus permitting the largest traffic flow per slot, and consequently the largest bandwidth and transponder utilization. Given a particular traffic matrix, a global optimum assignment may be obtained by taking into account all of the slots in a frame, or, a local optimum assignment may be obtained for a slot at a time, but the methods to obtain either the global or the local optimum are too complex and too time consuming for onboard operation. It is therefore necessary to consider use of an approach which is suboptimal but which has tractable logic and requisite speed of operation. However, a suboptimal approach is viable only if it is highly efficient in that it obtains the maximum or near maximum number of closures a large percent of the time.

The least-choice method is a suboptimal approach which schedules a slot at a time, and which achieves high efficiency by using a particular assignment strategy, as developed hereinafter. Inspection of binary matrix (b) shows that a closure in certain rows and/or columns may be accomplished in fewer ways, i.e., with less choice, than for other rows or columns. For example, for the traffic demand illustrated in FIG. 5(b), there is only one way of obtaining a closure in row 4, and similarly only one way in column 3, and one way in column 4, whereas there is more than one way of obtaining a closure in the remaining rows and columns. The absolute maximum number of closures occurs if there is a closure in each row and a closure in each column. This absolute maximum may possibly not be achieved in an optimum assignment for a given traffic demand matrix. However, it may be used as an assignment goal, and if so, then an appropriate strategy is to give priority to the selection of the single elements in row 4, column 3, and column 4. For if other elements are chosen first, then it may result in no element selected in the indicated rows and columns with the single elements, and fewer than the maximum closures in total. For example, if switchpoint (2,2) were chosen, then switchpoints (4,2) and (2,3) may not be chosen, resulting in no possible switchpoints chosen in either row 4 or column 3, thus ultimately resulting in a switchpoint assignment which may have no more than four closures. To forestall such an assignment when there is a possibility of achieving a better one, selection may be made first of switchpoints in rows and columns with the fewest number of ways of obtaining a switchpoint closure, or equivalently with the smallest row or column sums. Extending this one step further, one switchpoint should be selected in preference to a second switchpoint, if both the row and column sums of the first switchpoint are less than those of the second switchpoint. Accordingly, for each switchpoint (j,k) a cost may be defined to consist of its row sum, $R_j$, and its column sum, $C_k$. Since there is no priority between the rows and the columns, the cost is expressed as an ordered pair, which is ($R_j$, $C_k$) if $R_j \leq C_k$, or ($C_k$, $R_j$) if $R_j > C_k$. Thus, a switchpoint with a row sum equal to 1 and a column sum equal to 2 has a cost of (1,2), and a switchpoint with a row sum equal to 2 and a column sum equal to 1 also has a cost of (1,2). To define the switchpoints of smallest cost, consider among all switchpoints those with costs such that the first member of the cost pair is smallest, and then of these switchpoints, identify those with costs such that the second member is smallest. The switchpoints so identified are defined as the switchpoints of least cost, or equivalently of least choice.

In accordance with the present invention, the least-choice method constructs a cost matrix [$c''_{ij}$], illustrated in matrix (c) of FIG. 5, where each element is the ordered-pair cost, as defined above, of the corresponding element in binary matrix (b). A switchpoint assignment is now made by searching cost matrix (c) for an element of least cost. In this example, the elements at positions (4,2), (2,3) and (5,4) of matrix (b) all have costs of (1,2), as shown in matrix (c). Any one of these may be chosen as the assigned switchpoint. To prevent bias for any particular switchpoint, a random selection, or one that cycles among the switchpoints, may be made. In this example, switchpoint (4,2) is so chosen, as indicated by the circle around the cost (1,2) at position (4,2) of matrix (c), thereby indicating that for this exemplary time slot, the uplink from zone 4 will be connected to the downlink of zone 2.

After the switch assignment (4,2) is made, as shown in an assignment matrix [$t_{ij}$] of FIG. 5(d), an updated binary traffic matrix is formed, as shown in matrix (e), which indicates that row 4 and column 2 are blocked to further assignment. The least-cost element in matrix (e) occupies position (2,3) and has cost (1,1), as indicated by the circled element in matrix (f). Therefore, in accordance with the present invention, the switch connection (2,3) is assigned, as shown in matrix (d), indicating that for this exemplary time slot, the uplink from zone 2 will be connected to the downlink of zone 3. Continuing in a like manner, row 2 and column 3 of binary matrix (g) are blocked to further assignment. Again, the least-cost element, here occurring in row 5, column 4 is circled in cost matrix (h), and assigned to its like position in assignment matrix (d). The binary matrix in which row 5 and column 4 have been blocked is shown in matrix (i), and the associated cost matrix is shown in matrix (j). At this point in the process, any of the four remaining elements may be chosen as the uplink/downlink assignment, since all four are of the same cost, and as mentioned hereinbefore, a random or cycling process may be employed to ensure that the same switchpoint is not chosen every time a cost contention occurs. In this case, the element (2,2) of row 1, column 1 is chosen and added to assignment matrix (d). By default, therefore, row 3, column 5 is made the final assignment for the exemplary time slot used in FIG. 5. The complete set of uplink/downlink assignments which exist for this exemplary time slot are enumerated in FIG. 5(k).

FIG. 5 illustrates the assignment process for packets, or for one-way circuits which are expected to find primary use for bulk data transfer. Satellite circuits for voice communication require two-way circuits, comprising one circuit for the communication from the originating zone j to the terminating zone k, and a separate and distinct circuit for the return communication from zone k back to zone j. For an interzone two-way circuit, the two required assignments may be made in the same or in different slots in the frame, but for an intrazone two-way circuit, the two assignments must be made in different slots, because each slot contains only one possible switchpoint for a (j,j) connection. The assignment process described hereinabove may be altered to accommodate two-way circuits according to several methods. In one such method, for each entry in the traffic matrix at position (j,k), the like value is added to the position at (k,j), and for an intrazone circuit (j,j), this method results in a doubling of the traffic matrix entry at (j,j). Then, assignments are made as indicated hereinbefore, with the result that the two assignments for a two-way circuit are made independently of each other. At the end of assigning a frame, a controller (not shown) tests each interzone pair (j,k) and (k,j) to determine if the number of switchpoints assigned for (j,k) equals the number of switchpoints assigned for (k,j), and in the case of inequality, the controller voids a sufficient number of assignments such that equality is reached. In addition, the controller tests each intrazone switchpoint (j,j) to determine if the number of assignments is even, and if it is not even, the controller voids one assignment.

In a second method of handling two-way circuits, after a switchpoint (j,k) is selected in a slot for the primary circuit, then the switchpoint (k,j) in the same slot or another specifically designed paired slot is also selected for the return circuit. If the number of slots is odd, then in the final slot both the primary and return switchpoints of one or several interzone circuits may be assigned. To alter the assignment process described hereinabove to include either method of handling two-way circuits requires some additional logic, and to simplify the presentation of the present invention, this logic is not included in the following description, but is nevertheless assumed to be part of the assignment process herein disclosed.

A block diagram of an exemplary onboard satellite switch capable of performing the above-described function is illustrated in FIG. 6. As shown, a controller 4 is responsive to a plurality of ground stations (not shown) that wish to communicate with each other via the satellite. Each separate ground station, or a master ground station connected by terrestrial links to all ground stations in a zone for order-wire purposes only, relays to controller 4, on a frame-by-frame or possibly less frequent basis, the number of circuits and the number of packets it requires to communicate with each ground zone, including its own zone. Controller 4 then initializes both a traffic matrix circuit 6 and a least-cost selection circuit 8 where traffic matrix circuit 6 functions to form the binary matrices for circuits and packets and the cost matrices related thereto. Least-cost selection circuit 8 functions to form, on a slot-by-slot basis, the final assignments using the above-described least-choice method. Traffic matrix circuit 6 will be discussed in greater detail hereinafter in association with FIGS. 7 and 8 and least-cost selection circuit 8 will be discussed in greater detail hereinafter in association with FIGS. 9–16. It is to be understood that the data comprising any matrix herein described may be embodied in forms other than direct matrix form, as for example in list form, and still employ the principles of the present invention.

In association with FIG. 6, controller 4 initializes traffic matrix circuit 6 by providing thereto all of the current requests for circuits and packets. For packets, the current requests comprise those queued from previous frames plus those newly received from the ground. For circuits, two protocols may be used. In one protocol, request are received on a frame-by-frame basis and requests not assigned in a frame are blocked. In this case, the current requests comprise only those newly received from the ground. In the other protocol, requests are received on a less frequent basis than frame-by-frame, and requests not assigned in a specified period of time are blocked. In this case, the current requests comprise those newly received from the ground plus those queued and not blocked from previous frames.

For each slot, the binary and cost matrices for circuits are formed by traffic matrix circuit 6, where the binary matrix is formed by substituting a "one" for each nonzero element of the circuit traffic matrix, other than those elements in a row or column of an ongoing circuit for which zeroes are substituted. The binary and cost matrices so formed are subsequently accessed by selection circuit 8 which selects one switchpoint at a time and after selection transmits the identity of the selected switchpoint to controller 4, which stores it pending subsequent broadcasting to the ground of the entire switch schedule. The identity of the selected switchpoint is also transmitted back to traffic matrix circuit 6 which then decrements the selected switchpoint position in the circuit traffic matrix and adds the switchpoint to the ongoing circuit data. Least-cost selection circuit 8 then updates both the binary and the cost matrices and then selects a second least-cost switchpoint to be assigned and transmits the selected switchpoint back to traffic matrix circuit 6. The above-described process continues until all possible circuit requests have been satisfied with the available switchpoints for the current slot or until one of several limits on the number of assignments is reached, as is discussed in greater detail hereinafter. At that point least-cost selection circuit 8 transmits a signal to controller 4 to terminate the circuit assignment procedure for the current slot and initiate the packet assignment procedure for the current slot. Subsequently, controller 4 transmits a signal to traffic matrix circuit 6 which enables traffic matrix circuit 6 to form the binary matrix and the cost matrix for packets, where moreover, the binary matrix is formed by substituting a "one" for each nonzero element in the packet traffic matrix, other than those elements in a row or column of an ongoing circuit for which zeroes are substituted. The binary and cost matrices so formed are subsequently accessed by least-cost selection circuit 8, which applies the selection procedure described above for circuits, but now assigning packets to any switchpoints that are available and were not assigned circuit traffic. The identity of each switchpoint selected for a packet is transmitted to controller 4 which includes in it the total switch schedule subsequently broadcast to the ground.

Upon completion of the packet assignments for the current slot, least-cost selection circuit 8 transmits a terminate signal to controller 4 to reinitialize traffic matrix circuit 6 and least-cost selection circuit 8 to begin the assignments for the next slot of the current frame. The above-described process is then repeated using the circuits and packets not assigned in the preceding slot. When every slot in the current frame has been assigned, controller 4 then functions to broadcast the circuit and packet assignments to the ground and adds the unassigned packet requests, if any, to the newly arrived packet requests from the ground stations. In addition, controller 4 removes any blocked circuits, which under the first protocol for circuits indicated above, will be all unassigned circuits at the end of scheduling a frame, and under the second protocol will be those circuits for which the elapsed time since arrival exceeds a specified amount. Controller 4 sets the circuit traffic matrix as required either to newly arrived circuit requests, or to the sum of the newly arrived circuit requests and those previously arrived requests which have been neither assigned nor blocked. It should be noted that the identity of the blocked requests need not be broadcast to the ground, since these can be deduced on the ground from the assignments broadcasted and timing logic paralleling that in the satellite. Controller 4 then removes any terminated circuits from the ongoing circuits data, reinitializes both traffic matrix circuit 6 and least-cost selection circuit 8 to their respective start-to-frame conditions, and the entire above-described process is repeated.

Least-cost selection circuit 8 also places several limits on the number of circuits assigned, and on the number of packets assigned, per slot and per frame, as is described in greater detail hereinbelow. Under some conditions, it is desirable to give priority to the circuit and/or packet requests of one or several source-destination paths, each such path corresponding to a traffic matrix element. This may be advantageous, for example, if the demand for such a source-destination path becomes large relative to that of other paths. In addition, such priority may be externally imposed for emergency or military purposes. To implement such priority, controller 4 may be arranged to force one or several assignments prior to initiation of the least-choice procedure, and although this logic is not included in detail in the following description, it is assumed to be part of the process herein disclosed. Further, it has been determined that in implementation of the present invention, particular source-destination queues may become excessively long for circuits and/or packets. To alleviate this problem, controller 4 may transmit at variable times to traffic matrix circuit 6 a limit on the number of circuits and/or packets which may be assigned in a particular path or in a particular row or column of the traffic matrix. The effect of such limit is to reduce or completely curtail the circuit or packet assignments when the queue exceeds a specified level.

Figure 8:
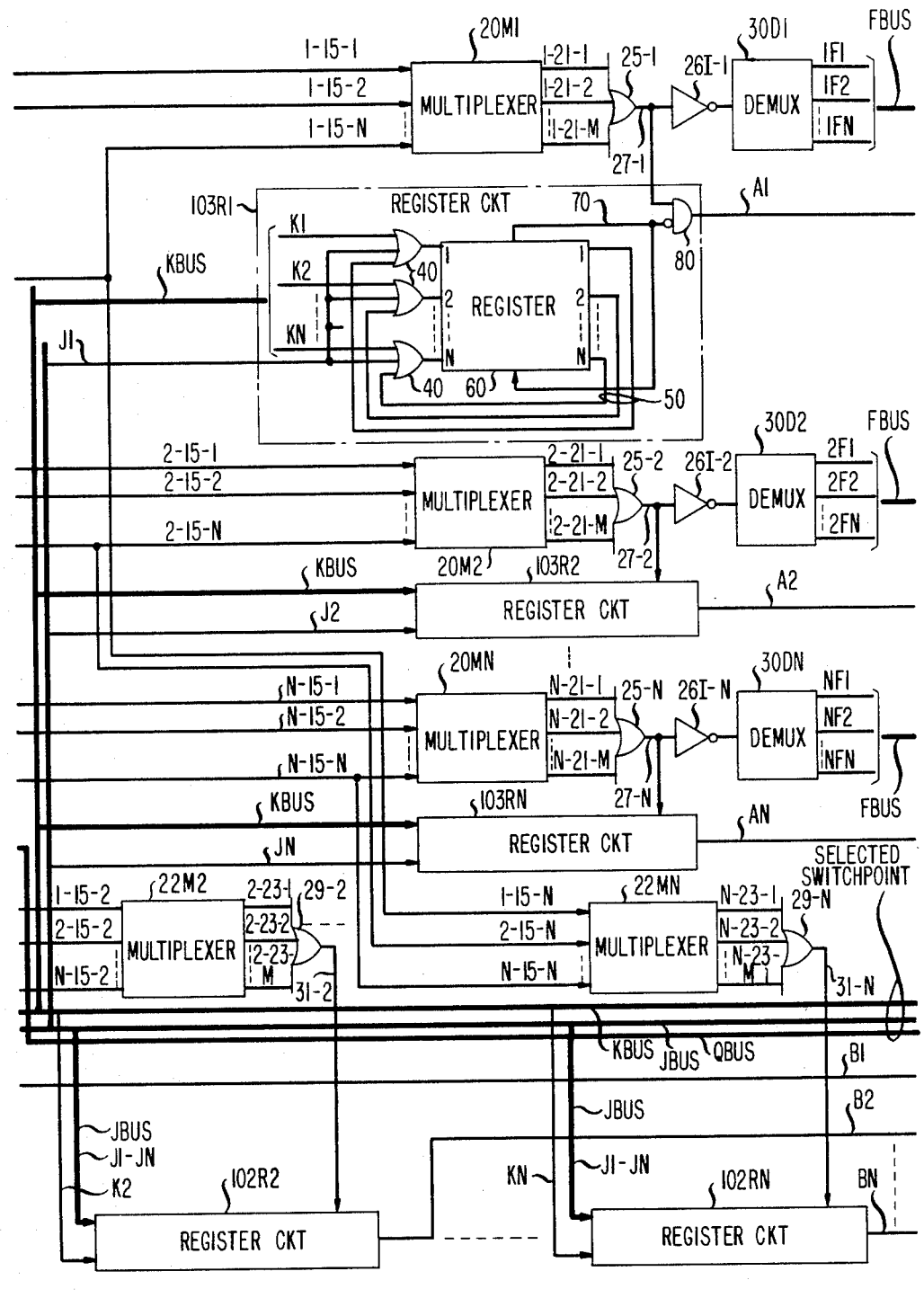

A detailed illustration of traffic matrix circuit 6 capable of forming both the binary traffic and cost matrices is contained in FIGS. 7 and 8. As shown, traffic matrix circuit 6 comprises, for an $N \times N$ system, a plurality of $N^2$ binary counter circuits 1C1-NCN, wherein each counter circuit is associated with a separate element in the traffic demand matrix, circuit or packet, depending on whether circuit or packet switched traffic is being scheduled. In formation, counter circuit 1C1 is associated with the element in the first row and first column of the traffic demand matrix, counter circuit 2C1 is associated with the element in the second row and first column of the traffic demand matrix, and so on, with counter circuit NCN associated with the element in the $N^{th}$ row and $N^{th}$ column of the traffic demand matrix.

Each counter circuit is loaded with its associated demand for circuit or packet traffic from controller 4 as indicated by the control input thereto.

As shown in FIGS. 7 and 8, traffic matrix circuit 6 also utilizes a plurality of 2N parallel-in parallel-out shift register circuits 103R1–103RN, 102R1–102RN, one shift register circuit associated with each row and one shift register circuit with each column of the traffic demand matrix. As shown, shift register circuit 103R1 is associated with the first row of the matrix, shift register circuit 103R2 with the second row of the matrix, shift register circuit 102R1 with the first column of the matrix, and so on, with shift register circuit 102RN associated with the $N^{th}$ column of the matrix.

A detailed illustration of an exemplary shift register circuit is shown in FIG. 8 for shift register circuit 103R1, where it is to be understood that each shift register circuit comprises identical circuitry. As shown in FIG. 8, each shift register circuit comprises a shift register 60, a plurality of OR gates $40_1$–$40_N$ and an AND gate 80. Shift register 60 contains N bits, one for each switchpoint in the associated row or column of the traffic demand matrix. A bit value of zero or one, respectively, indicates that the switchpoint associated therewith may or may not be selected for a new closure. A switchpoint may not be newly selected if either there already is an ongoing circuit for that switchpoint in the current slot, or if the switchpoint is in the row or column of an ongoing circuit. For example, if N is equal to four, then a bit pattern of 0101 in shift register 60 associated with row 2 indicates that the switchpoints in row 2, columns 2 and 4, may not be newly selected. The ongoing circuits differ from one slot to the next. Controller 4 causes the ongoing circuit data for a particular slot to be used when that slot is being scheduled.

A detailed illustration of an exemplary counter circuit is shown in FIG. 7 for counter circuit 1C1 where it is to be understood that each counter circuit 1C1–NCN comprises identical circuitry. As shown, each counter circuit comprises a traffic element counter 10, a frame sum counter 11, a register 12, a comparator 13 and an AND gate 14. Traffic element counter 10 is loaded by controller 4 with the actual demand requests from the ground station associated therewith.

Given the circuit or packet traffic demand in counters 10 and the ongoing circuit data for a particular slot in registers 60, traffic matrix circuit 6 operates in the following manner. Associated with counter circuits 1C1–NCN are a plurality of 2N multiplexers 20M1–20MN, 22M1–22MN, each multiplexer associated with a separate row or column of the traffic matrix. For example, the output of an exemplary counter circuit jCk is connected to both row multiplexer 20Mj and column multiplexer 22Mk via signal paths 15. The subcircuit in counter circuit 1C1 formed by counter 11, register 12, comparator 13 and AND gate 14 performs the function of limiting, separately for each switchpoint, the number of circuit assignments per frame and the number of packet assignments per frame. This function will be described in greater detail hereinafter, but for the purposes of the present discussion, it is sufficient to assume that the output of comparator 13 is equal to one, thereby enabling AND gate 14.

In operation, traffic matrix circuit 6 is paced through N clock cycles. On clock cycle number 1 each row multiplexer 20M1–20MN effectively selects the column one counter connected to it, and transmits counter 10 contents via signal paths 15 to a multiplexer output signal path 21, as shown in FIGS. 7 and 8. Similarly, on clock cycle one, each column multiplexer 22M1–22MN effectively selects the row one counter connected to it, and transmits the counter contents via signal paths 15 to multiplexer output signal paths 23. The data thus transferred to signal paths 21 and 23 is processed by the remainder of traffic matrix circuit 6, as will be discussed hereinafter. On clock cycle 2, each row multiplexer 20M1–20MN transfers its associated column 2 counter data to its associated signal path 21 and each column multiplexer 22M1–22MN transfers its assoicated row 2 counter data to its associated signal path 23. This data is then processed by the remainder of the circuit. This cycle of data transfer from counter circuits 1C1–NCN through multiplexers 20M1–20MN, 22M1–22MN to signal paths 21 and 23 and processing of the data, continues through N clock cycles. At the end of the $N^{th}$ cycle, controller 4 halts the operation of traffic matrix circuit 6 and initiates least-cost selection circuit 8, where least-cost selection circuit 8 is illustrated in detailed form in FIGS. 9–16.

As seen by reference to FIGS. 7 and 8, the output signals from multiplexer 20M1 proceed along signal paths 21-1 and are fed to OR gate 25-1, which outputs a zero or one, respectively, if the associated row and column counter contents are zero or non-zero, respectively. The output of OR gate 25-1 feeds to register circuit 103R1 to AND gate 80 where the function of AND gate 80 is discussed further below. As seen by reference to FIG. 8, the output of each OR gate 25-1 through 25-N associated with row register circuits 103R1–103RN is fed to a separate one of a plurality of N inverters 26I1–26IN, respectively. The outputs of inverters 26I1–26IN are subsequently applied as input to a plurality of N demultiplexers 30D1–30DN, respectively.

For the $L^{th}$ clock pulse operation of traffic matrix circuit 6, the input to demultiplexer 30D1 illustrated in FIG. 8 is transferred to its $L^{th}$ demultiplexer output 1FL. Thus on clock cycle 1, the input of zero or one is transferred to a first demultiplexer output 1F1. On clock cycle two, the input of zero or one is transferred to the second demultiplexer output 1F2, and so on, until clock cycle N, where the input of zero or one is transferred to the $N^{th}$ demultiplexer output 1FN. The N demultiplexer output signals are fed via signal paths 1F1–1FN to least-cost selection circuit 8 which uses these signals to prevent the selection of a switchpoint which has zero traffic demand. As indicated above, a signal of value one on any of the signal paths 1F1–1FN indicates that the associated traffic demand counter 1C1–1CN contents are zero. The signals on signal paths 1F1–1FN are clocked signals, having originated from multiplexer 20M1, which is operated in a clocked mode. Accordingly, any previous one signal on one of the signal paths 1F1–1FN is also returned to zero at the falling edge of the clock pulse.

As mentioned hereinbefore, the output of OR gate 25 is also fed to AND gate 80. As seen by reference to FIG. 8, the remaining input to AND gate 80 is an inverted signal from a signal path 70 which proceeds from shift register 60. Shift register 60 has two modes of operation, one of these being parallel-in, parallel-out, and may be used for loading or updating shift register 60. The other mode of operation of shift register 60 is serial-in, serial-out. The serial mode is used when supplying data from shift register 60 to signal path 70. As indicated above, the operation of traffic matrix circuit 6 is keyed to N clock cycles, where on each of the N clock cycles the contents of the exemplary row K counters KC1-KCN are delivered sequentially to signal path 21. Also, with each one of the N clock cycles, the contents of shift register 60 are shifted one bit, thus delivering the shift register 60 bits sequentially to signal path 70. Particularly, on clock cycle one, the bit corresponding to row 1, column 1, of the traffic demand matrix is delivered to signal path 70, on clock cycle 2, the bit corresponding to row 1, column 2 of the traffic demand matrix is delivered to signal path 70 and so on. Thus, at any given clock cycle L, the input to AND gate 80 originates from counter 1CL and from the column L bit of the row 1 shift register 60.

A value of one from the column L bit of shift register 60 in row 1 indicates that switchpoint 1,L may not be selected, and this Lth bit is inverted to zero at the entry to AND gate 80, thus blocking this gate. In this case, therefore, the output of AND gate 80 is equal to zero. However, a zero in the column L bit of shift register 60 is inverted to a one at the entry to AND gate 80, thus enabling AND gate 80 to pass the signal from OR gate 25. In this case, therefore, the output of AND gate 80 is zero or one, respectively, for the counter 1CL contents of zero or non-zero, respectively. The signals shifted out of shift register 60 are cycled back into the other end of the register. At the end of N clock cycles, therefore, shift register 60 is returned to the same state as at the start of the process.

Figure 9:
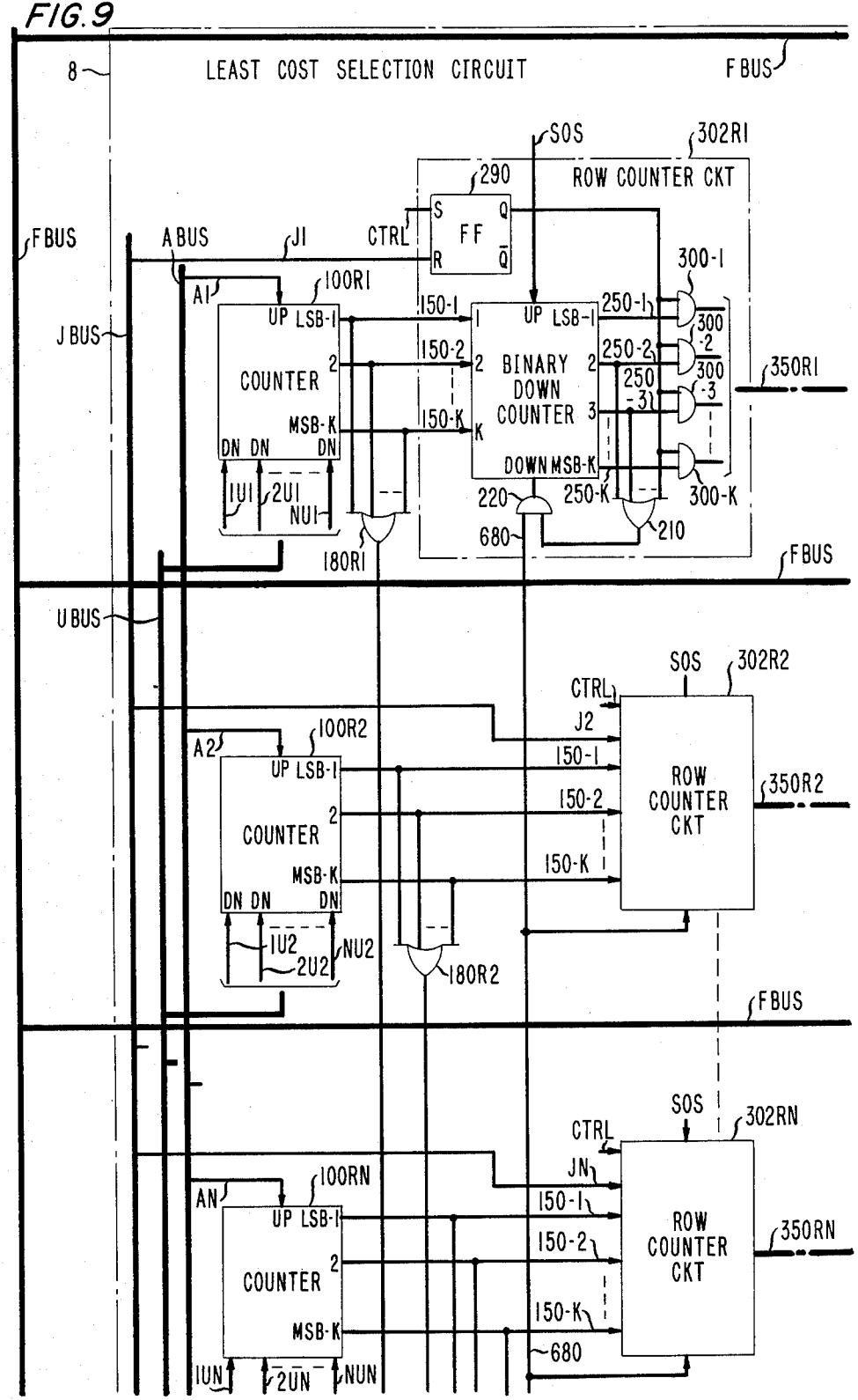

As previously indicated, the outputs of multiplexers 20M1-20MN, 22M1-22MN are clocked signals and therefore the output of AND gate 80, onto signal path A1-AN, B1-BN as the outputs of shift register circuits 103R1-103RN, 102R1-102RN, respectively, are also clocked signals. Accordingly, an output value equal to one on one of the signal paths A1-AN, B1-BN results in a rising edge and feeds to and increments one of a plurality of 2N counter circuits 100R1-100RN, 100C1-100CN, respectively, in least-cost selection circuit 8, as illustrated in FIGS. 9, 13, 14, and 15. In particular, as shown in FIG. 9, the output of AND gate 80 in register circuit 103R1 is fed via signal path A1 to the increment input of a counter 100R1. Thus, at the end of N clock cycles, counters 100R1-100RN, will contain the sums of rows 1-N, respectively, of the binary traffic matrix, and counters 100C1-100CN will contain the sums of columns 1-N, respectively, of the binary traffic matrix.

Figure 12:
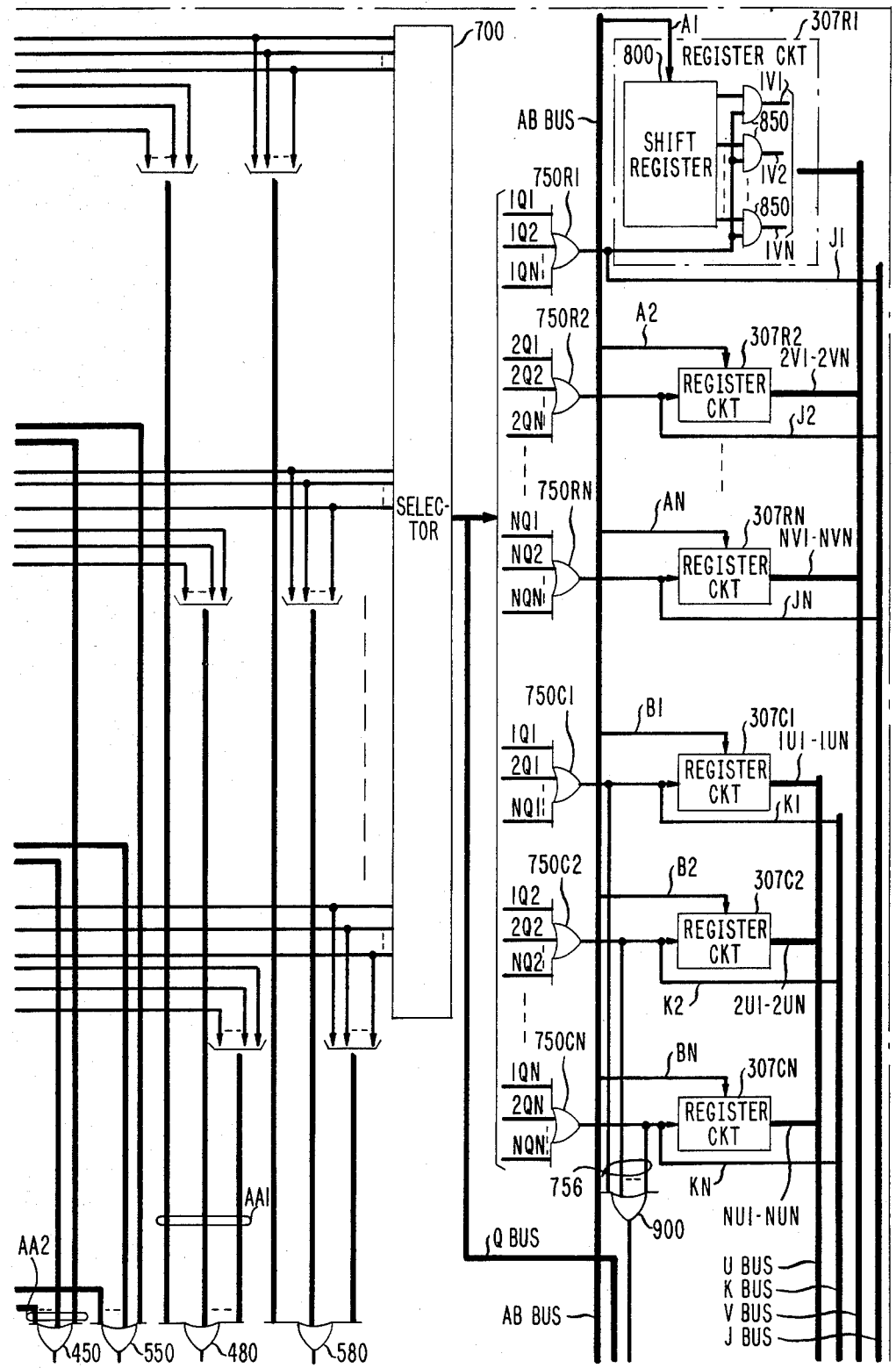

Also for each clock cycle, the 0 or 1 on each output signal path A1-AN, B1-BN feeds to one of a plurality of 2N registers 307R1-307RN, 307C1-307CN in least-cost selection circuit 8 of FIG. 12. In particular, as shown in FIG. 12, output signal A1 is coupled to the input of a shift register 800 of shift register circuit 307R1. Thus, at the end of N clock cycles, registers 800R1-800RN, will contain rows 1-N, respectively, of the binary traffic matrix, and registers 800C1-800CN will contain columns 1-N, respectively, of the binary traffic matrix.

The processing of the signals transferred through the remaining row multiplexers 20M1-20MN and the column multiplexers 22M1-22MN is similar to the process described above for row multiplexer 20R1 with the exception of the lack of demultiplexing associated with the column processing. Since row demultiplexers 30D1-30DN function to alert least-cost selection circuit 8 of any and all on-going switchpoints in the entire matrix, it is not necessary to duplicate these demultiplexers for column processing.

When a switchpoint is selected by least-cost selection circuit 8, by a process to be described in greater detail in association with FIGS. 9-16, several output signals are fed back to traffic circuit matrix 6. In particular, least-cost selection circuit 8 produces NxN switchpoint output signals 1Q1-NQN, N row output signals J1-JN, and N column output signals K1-KN. If a switchpoint is chosen in, for example, row S and column T, least-cost selection circuit 8 causes a 1 to be output on the signal paths related thereto, SQT, JS, KT, and a 0 on all the remaining Q, J, and K signal paths. The output of one on switchpoint signal path SQT, as shown in FIG. 7, feeds back to and decrements counter S10T, thus updating the traffic demand matrix. For circuit assignments, output of one on row signal path JS, as shown in FIG. 8, feeds back to shift register circuit 103RS, causing all of the inputs thereto to be set to the value one, and also feeds back to all of the column shift register circuits 102R1-102RN, causing the $S^{th}$ input of each column shift register to be set to the value one. For example, if S=1, then J1 feeds back to set row shift register 60R1 to all one's, and to set to one the first position of each column shift register 60C1-60CN. Similarly, the output of one on column signal path KT feeds back to cause all of the inputs to column shift register 60CT to be set to one, and also to cause the $T^{th}$ position in each row shift register 60R1-60RN to be set to one. As seen in FIGS. 7 and 8, the JS and KT signals feed indirectly to shift registers 60R1-60RN, 60C1-60CN through a plurality of OR gates 40. The actual loading of the signals into shift registers 60R1-60RN, 60C1-60CN, is initiated by a separate signal (SOS) from least-cost selection circuit 8 which will be described hereinafter. Initiation of loading is inhibited by controller 4 when packets are being assigned. For correct operation, it is necessary to preserve the ones in the other positions of shift 60R1-60RN, 60C1-60CN in this reloading process. To do this, each bit of each shift register 60 is fed back via a signal path 50 and OR gates 40 to the input of shift register 60.

As mentioned hereinabove, and illustrated for counter circuit 1C1 of FIG. 7, each traffic demand counter 10 has in association with it a binary counter 11, binary register 12, comparator 13 and AND gate 14. These components comprise a first part of the implementation of the hereinbefore mentioned movable-boundary protocol for dividing switch capacity between circuits and packets. In particular, these components comprise the arrangement necessary to limit for each particular switchpoint the number of circuits assigned in the several slots of a frame. A second part of the movable-boundary protocol implementation wherein a limit is placed on the total number of circuits including all switchpoints in all slots is described hereinafter in connection with least-cost selection circuit 8.

At the start of assigning the circuits for a frame, associated with each switchpoint S,T controller 4 sets in counter circuit SCT the number of switchpoints S,T in the several slots of a frame that have been previously assigned to circuits. As discussed above, when an assignment for switchpoint S,T is made, a one is output on signal path SQT, which feeds to and decrements the associated traffic demand counter 10. When enabled by controller 4, the one on signal path SQT also increments the associated counter 11. Incrementation is enabled during processing of circuits and disabled during processing of packets, with the result that counter 11 contains the number of switchpoints assigned to circuits in row S, column T, at any given point of the frame processing. Controller 4 initially sets the associated register 12 to the maximum number of circuits allowable for switchpoint S,T in the several slots of a frame. When processing circuits, controller 4 enables an associated comparator 13, and as long as the number of circuits assigned, as recorded in counter 11, is less than the limit in register 12, comparator 13 will output a one, enabling AND gate 14. If the limit is reached, comparator 13 outputs a zero, which disables AND gate 14, causing it to output a value of zero, and effectively preventing any further circuit assignments for switchpoint S,T in the frame. When the output of AND gate 14 is equal to zero, the subsequent processing is identical to that previously described for the situation where there the zero output of counter 10 indicates no demand. When processing packets, controller 4 disables comparator 13 and furthermore causes it to output a one, thus enabling AND gate 14 to pass the contents of counter 10 onto the associated signal path 15, resulting in the ability to assign packets to any capacity not assigned to circuits.

It should be noted that it is possible to set register 12 with maximum movable-boundary values which differ depending on the switchpoint. Further, if the maximum value equals zero for all switchpoints, a pure packet system results, and if the maximum value equals the number of slots per frame for all switchpoints, a system results in which circuits have complete priority over packets.

Referring next to FIGS. 9–16, the structure and operation of least-cost selection circuit 8 is now described. Least-cost selection circuit 8 is asynchronous, requiring no access to a system clock. Signals required to control actions such as loading of counters, resetting flip-flops, and initiating decoder operations are derived from the circuit itself.

Figure 13:
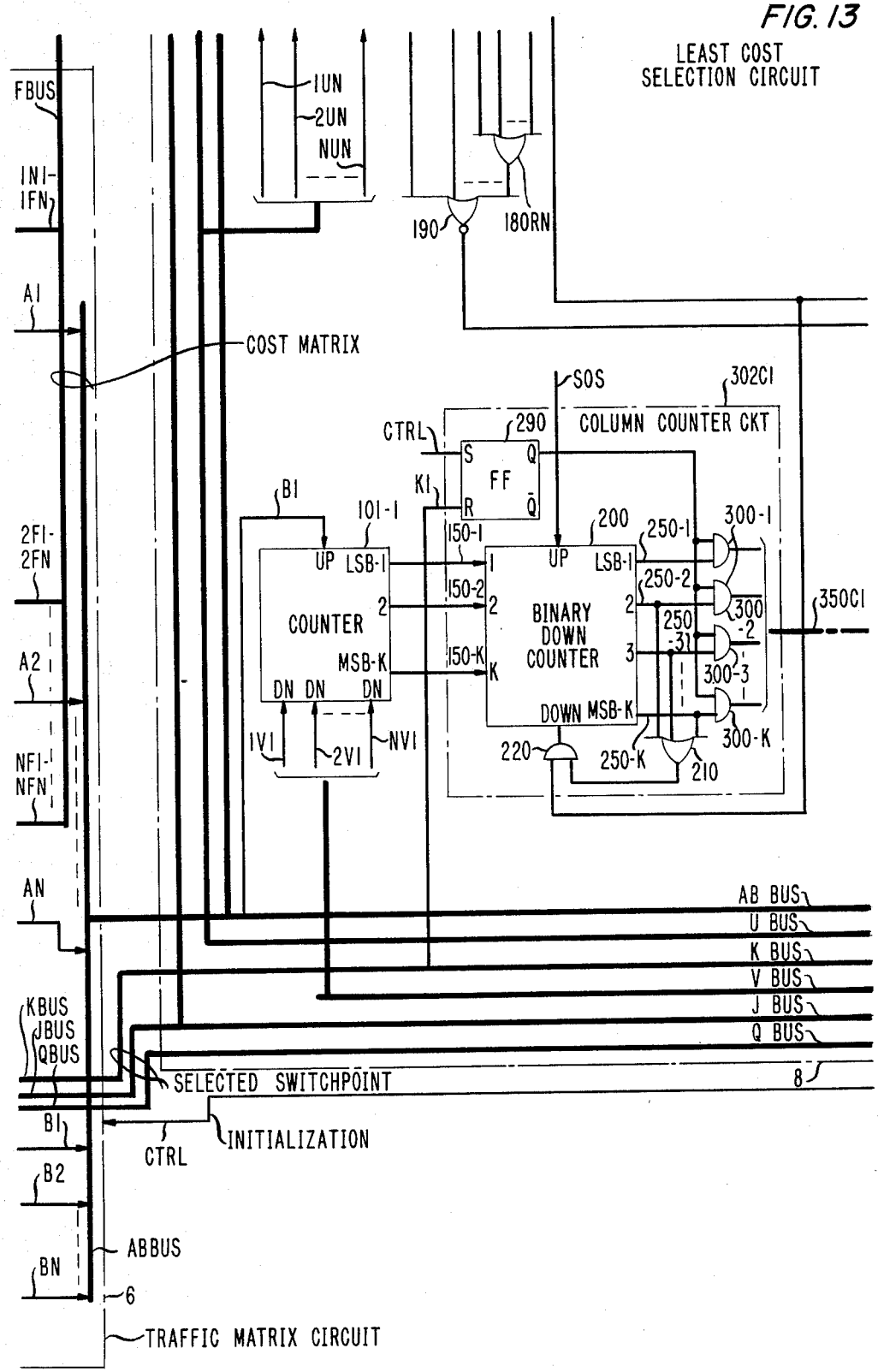

Least-cost selection circuit 8 includes, as illustrated in FIGS. 9, 13, 14 and 15, a plurality of 2N counter circuits 302R1–302RN, 302C1–302CN. As described hereinbefore in association with traffic matrix circuit 6, an output of one on an exemplary output signal path A1 indicates that a demand exists and, that there is no ongoing circuit to block assignment. Therefore, as described hereinbefore, the output of one on an exemplary signal path A1 will increment the contents of an associated counter 100R1 of least-cost selection circuit 8 of FIG. 9, as illustrated in FIG. 13. Thus, at the completion of N clock cycles, each counter 100R1–100RN, 100C1–100CN will contain either the row sum or the column sum of the traffic demand associated therewith.

Least-cost selection circuit 8 determines the switch closure pattern, i.e., the interconnection of uplinks and downlinks, one switchpoint at a time. At the start of selecting each switchpoint, a start-of-switchpoint (SOS) signal performs several initializing functions, as will be described in greater detail hereinbelow. For the first switchpoint assignment, the SOS signal is provided by controller 4; subsequently, the SOS signal is derived from least-cost selection circuit 8 itself.

The SOS signal initiates the loading of a plurality of 2N binary down counters 200R1–200RN, 200C1–200CN where each counter is associated in a one-to-one relationship with counters 100R1–100RN, 100C1–100CN and an exemplary down counter 200 is included in the illustration of row counter circuit 302R1 in FIG. 9 and in column counter circuit 302C1 in FIG. 13. Referring to row counter circuit 302R1, counter circuit 100R1 is connected thereto via a set of parallel signal paths, collectively denoted 150, where the number of signal paths connecting counter 100R1 to binary down counter 200R1 is the logarithm of N to the base 2, rounded to the next higher integer, denoted here simply as log N, or alternatively, K. As shown, the log N outputs are in parallel, where the top output is denoted LSB for least-significant bit, and the bottom output is denoted MSB for most significant bit.

As shown in FIGS. 9 and 13, each set of output signal paths 150 associated with row counter circuits 302R1–302RN, respectively, are also applied as separate inputs to a plurality of N OR gates 180R1–180RN, respectively. The plurality of N outputs from OR gates 180R1–180RN are subsequently applied as separate inputs to a NOR gate 190. If the output of NOR gate 190 is equal to one, this indicates that the contents of each counter 100R1–100RN is equal to zero, and thus, there is no traffic remaining to be scheduled. The output of NOR gate 190 is subsequently fed back to controller 4, which will function to terminate the operation of least-cost selection circuit 8 upon receipt of an output valve of one from NOR gate 190.

If the output of NOR gate 190 is equal to zero, processing in least-cost selection circuit 8 continues, as shown in row counter circuit 302R1, through binary down counter 200 via a plurality of parallel signal paths 250 into a plurality of AND gates 300, where each AND gate of an exemplary plurality of AND gates 300 is associated with a separate signal path of the associated plurality of parallel signal paths 250. Also, shown in association with counter 200 of row counter circuit 302R1, each plurality of signal paths 250 with the exception of the path corresponding to the least significant bit, are simultaneously applied as separate inputs to an OR gate 210. OR gate 210 functions to determine if the value of counter 200 associated therewith is equal to either one or zero. If either output exists in an exemplary binary down counter 200, the output of OR gate 210 associated therewith will be zero. The output of OR gate 210 is subsequently applied as an input to an AND gate 220. The output of AND gate 220 is subsequently fed back to the decrement input of its associated binary down counter 200. If the output of an exemplary OR gate 210 is equal to zero (indicating the presence of either the value of zero or one in its associated binary down counter 200), its associated AND gate 220 will be disabled, thus preventing a decrementation of binary down counter 200. Preventing an exemplary binary down counter 200 from decrementing when its associated value is either zero or one simplifies the subsequent logic of least-cost selection circuit 8, as will be discussed in greater detail hereinafter.

As stated hereinabove, each plurality of output signal paths 250 is also applied as an input to a separate plurality of AND gates 300. Each plurality of AND gates 300 is also responsive, as shown in FIG. 13, to the output of a flip-flop 290. Flip-flops 290 associated with row counter circuits 302R1–302RN are activated by the J1–JN output signals, respectively, of least-cost selection circuit 8. Flip-flops 290 associated with column counter circuits 302C1–302CN are activated by the K1–KN output signals, respectively, of least-cost selection circuit 8 as illustrated by column counter circuit 302C of FIG. 13. When a switchpoint S,T is selected by least-cost selection circuit 8, as discussed further below, other switchpoints in the same row S and column T must be prevented from being subsequently selected in the same slot. This is accomplished by activating the flip-flop 290, associated with the indicated row S and the flip-flop 290 associated with column T. For example, if the switchpoint in row 1, column 1 is selected, then the signals denoted as J1 and K1 in FIGS. 9 and 13 are changed from zero to one, causing the associated flip-flops 290 to output a zero. Flip-flops 290 are reset to the value one by controller 4 at the start of the assignment process for each slot. The signals output from each set of AND gates 300 contained in counter circuits 302R1–302RN, 302C1–302CN are fed via a plurality of signal paths 350 to decoder circuits 1D1–NDN, as shown in FIGS. 10 and 11.

Figure 10:
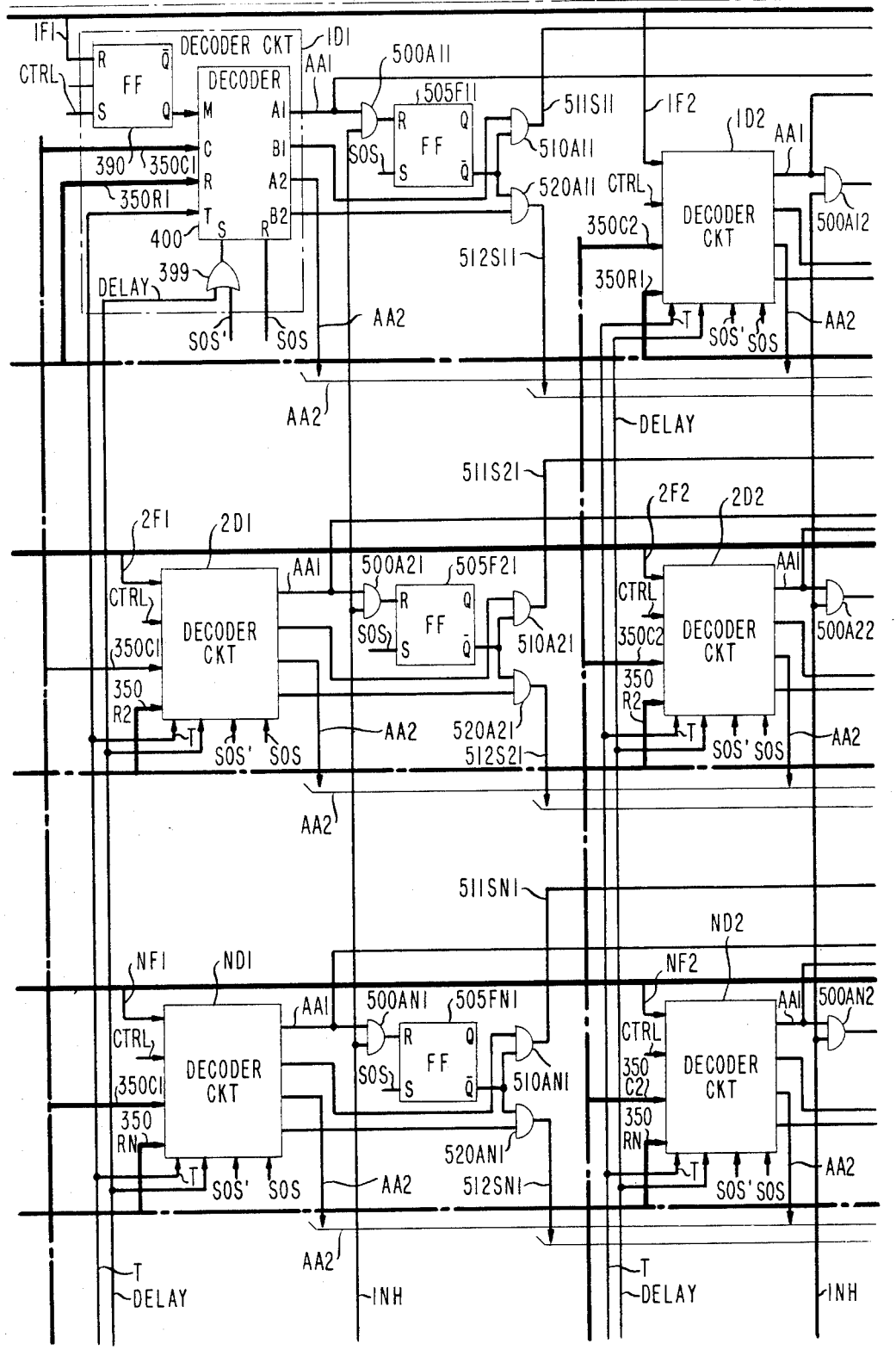
Figure 11:
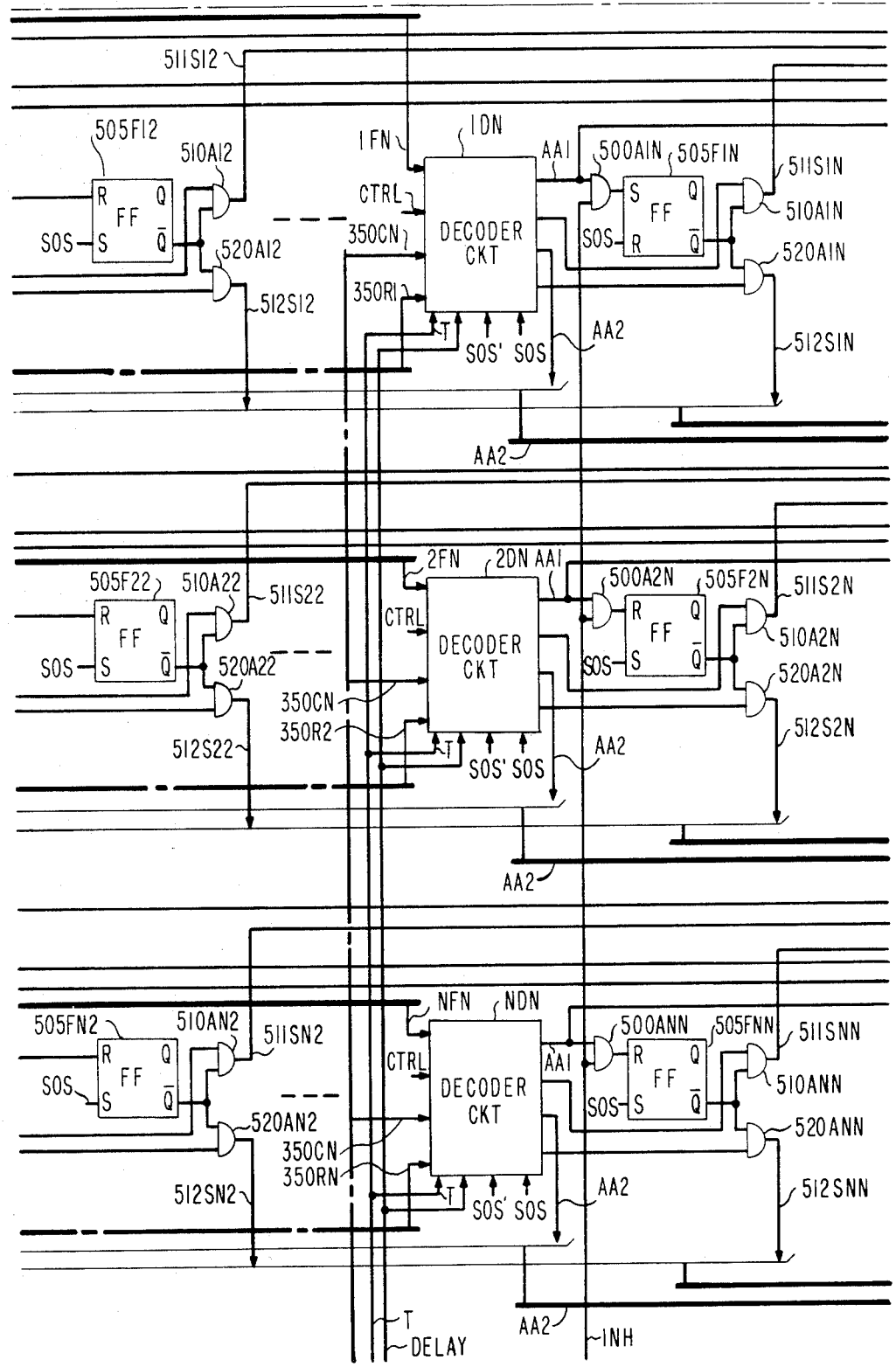

An exemplary decoder circuit is illustrated in FIG. 10 for decoder circuit 1D1, where it is to be understood that each decoder circuit 1D1–NDN contains the identical circuitry and is associated with a separate one of the N×N switchpoints in the traffic demand matrix. As shown in FIG. 10, decoder circuit 1D1 includes a decoder 400, where the outputs from the set of AND gates 300R1 are applied as inputs, via signal paths 350R1 to the R input of decoder 400. Similarly, the outputs from the set of AND gates 300C1 are applied as inputs, via signal paths 350C1, to the C input of decoder 400. As seen by reference to FIG. 10, there are two other input signals to decoder 400, labeled M and T. The M signal is supplied by an associated flip-flop 390. At the beginning of processing a slot, controller 4 initializes each flip-flop 390 to output the value one. Flip-flop 390 illustrated in FIG. 10 is also responsive to the output signal along signal path F from demultiplexer 30 associated with the row and the column that decoder circuit 1D1 occupies. Thus, for each element in the traffic demand matrix that is zero, or for each switchpoint that has reached its limiting number of assignments, traffic matrix circuit 6, as shown in FIG. 8, transmits a one on the corresponding signal path F from demultiplexer 30, thereby causing corresponding flip-flop 390 to output a zero. As is discussed in greater detail hereinbelow, setting flip-flop 390 to zero effectively blocks the associated switchpoint from being selected. The T signal input to decoder 400 originates from a flip-flop 395 included in FIG. 15. Flip-flop 395 is operated in the toggle mode, so that each time it receives a signal changing from zero to one (a rising edge), the output is alternated between zero and one. The purpose of this alternation of flip-flop 395 is described in greater detail hereinbelow in association with the discussion of FIG. 15.

The function of decoders 400 and the subsequent portions of least-cost selection circuit 8 is to identify a switchpoint of least cost. As discussed previously, the cost of a switchpoint is the ordered pair of the indicated row sum and the column sum. For example, if a switchpoint has a row sum of 4, and a column sum of 5, then its cost is (4,5); it has the same cost if the row sum is 5, and the column sum is 4. To determine the switchpoints of least cost, least-cost selection circuit 8 first identifies those switchpoints with the smallest first member of the ordered pair. Then, among the switchpoints so identified with smaller first members, least-cost selection circuit 8 identifies those with smallest second member, i.e., those of least-cost. Finally, since several switchpoints may be of least-cost, a selector 700 illustrated in FIG. 12 and included in least-cost selection circuit 8 functions to choose one among them.

At the beginning of selecting each new switchpoint, the start-of-switchpoint (SOS) signal initializes several parts of least-cost selection circuit 8 including, as mentioned hereinabove, the loading procedure of binary down counters 200. After counters 200 are loaded, a delayed version, denoted SOS', of the SOS signal, is applied as an input to a plurality of $N^2$ OR gates 399, where each OR gate 399 is associated with a separate one of the decoders 400 contained in decoder circuits 1D1–NDN. An exemplary OR gate 399 is contained in the illustration of decoder circuit 1D1 in FIG. 10. The output of OR gate 399, as shown in FIG. 10, is applied as a strobe input, labeled S, to decoder 400, where the presence of the strobe input signal will cause decoder 400 to load its associated inputs labeled M, R, C and T for the first switchpoint selection.

At the beginning of a slot, the inputs R and C of each decoder 400 are the row and column sums, respectively, associated therewith. For example, as can be determined by reference to FIGS. 10 and 13, the R input to decoder 400 of decoder circuit 1D1 is output signal path 350R1 which transmits the row sum related thereto, and similarly, the C input to decoder 400 is output signal path 350C1 from counter 200C1, which transmits the column sum related thereto. In general, therefore, the R input to a decoder 400 is output signal path 350R and the C input to decoder 400 is output signal path 350C. Each decoder 400 comprises the same logic, where the various input signals are associated with the various output signals in the manner illustrated in Table 1 shown below, where a dash indicates a "don't care" value, and parentheses indicate alternative values of the T input.

TABLE 1

| Case | I | II | III | IV | V | VI | VII |
|---|---|---|---|---|---|---|---|
| Input |  |  |  |  |  |  |  |
| M | 0 | — | — | 1 | 1 | 1 | 1 |
| R | — | 0 | — | 1 | 1 | >1 | >1 |
| C | — | — | 0 | 1 | >1 | 1 | >1 |
| T | — | — | — | 0 | 0(1) | 0(1) | 0(1) |
| Output |  |  |  |  |  |  |  |
| A1 | 0 | 0 | 0 | 1 | 1 | 1 | 0 |
| B1 | — | — | — | 1 | 0 | 0 | 0 |
| A2 | 0 | 0 | 0 | — | 0 | 0 | A1($\overline{A1}$) |
| B2 | 0 | 0 | 0 | — | B1($\overline{B1}$) | B1($\overline{B1}$) | B1($\overline{B1}$) |

Case I above occurs when the associated traffic demand matrix element (M input) is zero, or where the number of assignments for a switchpoint in the current frame has reached its associated limit. Cases II or III above occur when the associated row or column, respectively, of the binary matrix contains a switchpoint that has already been chosen. In each of these three cases, an exemplary decoder 400 output A1 is equal to zero, as seen by reference to Table 1. An A1 output of zero will disable both an associated AND gate 500 and an AND gate 510, resulting in a zero input to selector 700. Since selector 700 choses among inputs with a value of one, the switchpoint associated with a decoder 400 is, therefore, blocked from being selected if M=0, R=0, or C=0.

Figure 15:
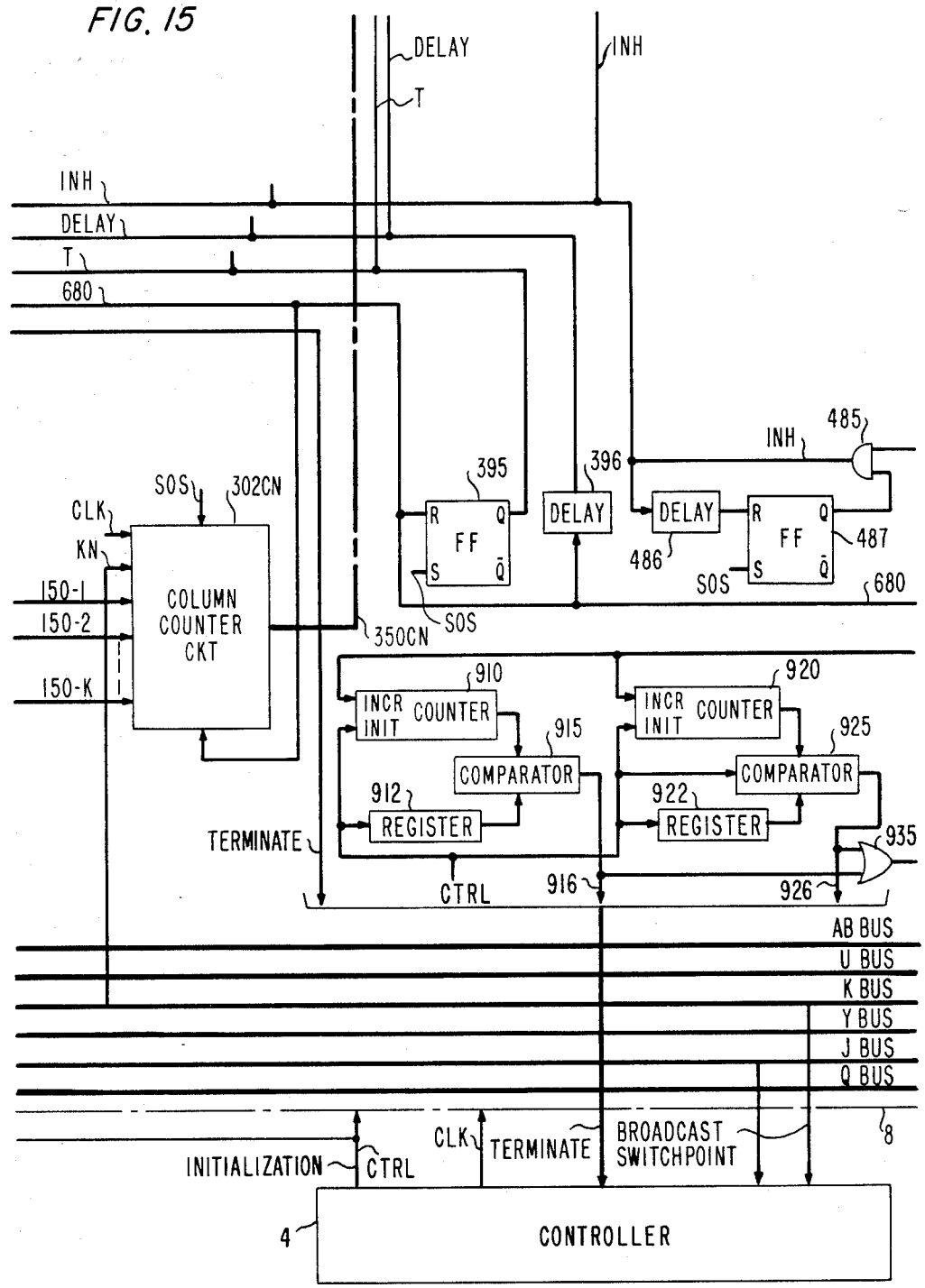

In all of the remaining cases, the M value is equal to one. For cases IV, V, and VI, as shown in Table 1, either one or both of the row and column sums are equal to one. This value of one makes the first member of the associated cost ordered pair equal to one, the smallest value it may assume. In these cases, as seen by reference to Table 1, the A1 output of the associated decoder 400 is equal to one. As seen by reference to FIGS. 10, 11 and 12, all of the A1 outputs of decoders 400 are applied as separate inputs to an OR gate 480 illustrated in FIG. 12. If at least one A1 output is equal to one, the output of OR gate 480 will also be equal to one. The output of OR gate 480 is subsequently applied as an input to an AND gate 485 of FIG. 15. A flip-flop 487, which as shown in FIG. 15 is initialized to output a one by the SOS signal, is applied as a second input to AND gate 485. Therefore, when both inputs to AND gate 485 are equal to 1, AND gate 485 will produce the value one as an output which is subsequently applied as an inhibit input to each one of a plurality of N×N AND gates 500A11–500ANN, illustrated in FIGS. 10 and 11. As mentioned before, the remaining input to AND gate 500 is the A1 output from its associated decoder 400. Therefore, since any switchpoint with an M, R, or C input equal to one will produce an A1 output equal to one, the associated AND gate 500 will also produce an output equal to one. Recall that these switchpoints will be those with the first value of its associated cost ordered pair equal to one. As seen by reference to FIG. 10, all flip-flops 505 are initialized by the SOS signal to output a zero. An output of one from AND gate 500A11 will set the associated flip-flop 505F11 to output a one. Since none of the remaining decoders outputs a one, the associated flip-flops will continue to produce an output equal to zero.

Moreover, in selecting a new switchpoint, it is necessary, as is discussed further below, that flip-flops 505F11–505FNN be set only the first time that OR gate 480 passes a one in the determination of a new switchpoint. To prevent any subsequent setting of flip-flops 505F11–505FNN, the output of one from AND gate 485 of FIG. 15 is also fed to a delay unit 486, where the output of delay unit 486 is applied as an input to flip-flop 487. When this input to flip-flop 487 is equal to one, the output of flip-flop 487 becomes a zero, which then blocks AND gate 485, and consequently all AND gates 500A11–500ANN. The feedback from delay unit 486 and flip-flop 487 to AND gate 485 effectively delivers a pulse to AND gates 500A11–500ANN and to the affected flip-flops 505F11–505FNN. Therefore, a flip-flop 505 which was not set to output a one at this point, will not be so set for the remainder of the selection of the new switchpoint, even though the input to the associated AND gate 500 from the A1 decoder output may subsequently become a one.

For case IV, the processing beyond flip-flops 505F11–505FNN is straightforward. Specifically, an output of one from a flip-flop 505 enables a pair of associated AND gates 510 and 520. The B1 output of the associated decoder 400, as seen in Table 1, is also equal to one for case IV, where this output is applied as the second input to its associated AND gate 510. Therefore, the output of AND gate 510 is also equal to one. The output of AND gates 510A11–510ANN are subsequently applied along signal paths 511 as separate inputs to an OR gate 580 included in FIG. 12. An output of one from any 510A11–510ANN will, therefore, cause the output of OR gate 580 to be equal to one. The output of OR gate 580 is subsequently inverted and applied as an input to an AND gate 590 of FIG. 16, where an output of one from OR gate 580 will become a zero and thus disable AND gate 590. As seen by reference to FIGS. 10–12, the output of each AND gate 510A11–510ANN is also applied as as input to selector 700, where an input of value one to selector 700 thus identifies the associated switchpoint as one of least-cost.

Consider next the situation where case VII exists for at least one decoder 400, and where cases IV, V, or VI do not exist for any decoder, i.e., only cases I, II, III and at least one case VII exist. Then, as seen by reference to Table 1, the first member of the ordered cost pair related to each decoder for which case VII exists is greater than one (>1). Consider now the result of reducing each member of each ordered pair in the cost matrix by one. The elements in the reduced cost matrix will bear the same relationship to each other as in the original cost matrix, with respect to ranking by the ordered-pair cost. For example, if the non-zero elements of a cost matrix are (3,4), (3,5), (4,4), (4,5), and (5,5), then the reduced elements are (2,3), (2,4), (3,3), (3,4), and (4,4). The two sets rank exactly the same with respect to ordered-pair cost. The second set may be further reduced to (1,2), (1,3), (2,2), (2,3), and (3,3), which is equivalent to both the previous sets. Least-cost selection circuit 8 performs this subtraction iteratively, until a set of ordered-pair costs is obtained with at least one first member equal to one. As soon as this occurs, case VII vanishes for at least one decoder 400, and is replaced by one of the cases IV, V, or VI. Least-cost selection circuit 8 then proceeds with the above-described procedures for cases IV, V, or VI. The manner in which least-cost selection circuit 8 performs the indicated reduction is described hereinbelow.

For the situation where cases I, II, III and at least one case VII exist for decoders 400, all of the A1 outputs will be equal to zero, as seen by reference to Table 1. This condition will result in a zero output of OR gate 480 of FIG. 12, which in turn blocks AND gate 485 of FIG. 15 and consequently also blocks AND gates 500A11–500ANN. The output of zero from OR gate 480 is also inverted to a one at the entry to AND gate 490 of FIG. 16, thus enabling AND gate 490. As seen by reference to FIGS. 10 and 11, each A2 output from decoders 400 is subsequently applied as an input to an OR gate 450 of FIG. 12, where the output of OR gate 450 is subsequently applied as an input to AND gate 490 of FIG. 16. Since the T input of each decoder 400 is initialized to the value one by the SOS signal, the A2 output will be equal to $\overline{A1}$, or one at this time, for all case VII decoders 400 as seen by reference to Table 1. Since it is assumed that there is at least one decoder 400 with case VII, there is at least one input of value one to OR gate 450, thereby resulting in an output value of one from this gate. This output of one is passed through AND gate 490 and is subsequently applied as an input to an OR gate 600, where it will then become the output value of OR gate 600.

As described hereinbefore, the initialization due to the SOS signal resulted in a zero on signal path 610 and in a one on signal path 620. Accordingly, the output of one from OR gate 600 causes the value on signal path 610 to change from zero to one, which triggers a monostable multivibrator 630 to output a one-shot positive pulse, which propagates along signal path 645, and through OR gate 670, and onto signal path 680.

Returning to OR gate 600, the one output therefrom is also applied as an input to an inverter 615, resulting in a value of zero propagating along a signal path 620 to a monostable multivibrator 650. An input of zero to multivibrator 650 will not cause a pulse to be output from multivibrator 650. The effect of an input of one to multivibrator 650 will be discussed further below.

A pulse propagating along signal path 680 effects several actions. First, this signal is fed back to the plurality of 2N AND gates 220. One such AND gate in each of the row counter circuits 302R1-302RN, and in each of the column counter circuits 302C1-302CN. An exemplary AND gate 220 is contained in row counter circuit 302R1 illustrated in FIG. 9, and in column counter circuit 302C1 of FIG. 13. As previously described and can be seen by reference to FIG. 9, if a counter 200 contains a value greater than one, a one is passed through its associated OR gate 210 to AND gate 220. This value of one in association with the pulse passing along signal path 680 will allow AND gate 220 to output a one, and decrement counter 200. Recall that each decoder 400 receives input from both an associated row counter 200R and an associated column counter 200C via signal paths 350R and 350C, respectively. The pair of row counter circuit 302RS and column counter circuit 302CT contained in their binary down counters 200 the ordered-pair cost data for switchpoint S,T. Thus, decrementing counters 200R and 200C in the above-described fashion results in the reduction of all ordered pair values as described above. An erroneous subtraction is prevented by only allowing an OR gate 210 as described hereinabove, to output a value of one if the associated counter 200 contains a value greater than one.

Returning to FIG. 16, the output from OR gate 670 is also applied as an input to both a flip-flop 395 and a delay unit 396 of FIG. 15. Flip-flop 395 is initially set to the value of one by the SOS signal. Therefore, a pulse from OR gate 670 toggles flip-flop 395, changing the output at this time from a one to a zero, where this value of zero is applied as the T input to each decoder 400. The pulse applied to delay unit 396 from OR gate 670 will allow sufficient time for the affected binary down counters 200R1-200RN, 200C1-200CN to be decremented, as described hereinbefore. After the delay, the pulse from delay unit 396 is applied as an input, as seen by reference to FIG. 10, to OR gate 399, and subsequently to the S terminal of decoder 400 associated therewith. This pulse applied as the S, or strobe input, will allow decoders 400 of decoder circuits 1D1-NDN to receive the updated contents of binary down counters 200R1-200RN, 200C1-200CN via signal paths 350R1-350RN, 350C1-350CN.

If decrementing binary down counters 200R1-200RN, 200C1-200CN by one results in changing at least one case VII decoder 400 to either case IV, V, or VI (i.e., decoder 400A1 output equal to one), the decrementation process is halted and the above-described process related to cases IV, V, and VI is resumed. However, if after the subtraction of one from binary down counters 200R1-200RN, 200C1-200CN, the situation still applies that all decoder 400 inputs comprise cases I, II, III or VII, the subtraction process continues as follows.

Referring back to Table 1, since the T decoder input is now equal to zero, any decoder 400 with a case VII now outputs at its A2 terminal a value equal to $\overline{A1}$, or zero. Recall that for these case VII decoders 400 the previous A2 output was $\overline{A1}$, or one, resulting in an output of one from OR gate 450. Now, the A2 outputs from all decoders 400 are equal to zero, resulting in outputs of zero from OR gate 450, AND gate 490, and OR gate 600.

Returning to FIG. 16, the zero output from OR gate 600 will not cause monostable multivibrator 630 to output a pulse. However, the zero output from OR gate 600 will be changed to a one by inverter 615, causing monostable multivibrator 650 to output a positive pulse onto signal path 665. As described hereinbefore, the SOS signal initializes decoder 400 outputs to zero, resulting in a one on signal path 620. If there had been a zero on signal path 620 from prior operation, the initialization causes a change from zero to one on signal path 620, thereby causing multivibrator 650 to output a pulse. At initialization, this pulse is blocked at AND gate 666 by the zero input of the inverted SOS signal fed to AND gate 666. Subsequent to initialization, the SOS signal has value zero, which when inverted to one, permits a pulse from multivibrator 650 to pass onto signal path 667 and then through OR gate 670.

The pulse output from multivibrator 650 follows the same signal path 680 as did the pulse output from multivibrator 630 described hereinbefore. Namely, the pulse along signal path 680 will decrement binary down counters 200R1-200RN, 200C1-200CN containing values greater than 1, toggle flip-flop 395, and provide the strobe input S to reload decoders 400.

The looping through decoders 400 and through the logic between OR gate 450 and OR gate 670, and decrementing counters 200R1-200RN, 200C1-200CN continues until at least one decoder 400 input becomes case IV, V, or VI. Each time through the loop, a pulse is delivered onto signal path 680 to cause the decrementation of counters 200R1-200RN, 200C1-200CN. On successive times through the loop, the pulse is delivered alternately by multivibrator 630 and by multivibrator 650. The alternation is controlled by flip-flop 395, which alternates output between zero and one, thereby alternating the value of the T input to decoders 400. This alternation in value of the T input between 0 and 1 will cause the A2 output to alternate between A1 and $\overline{A1}$, respectively. The alternation of the A2 output from decoders 400 in turn alternates the outputs of OR gate 450, AND gate 490, and OR gate 600 between zero and one. It is to be noted that the pulse delivered at each iteration to signal path 680 could also be derived from a system clock. However, providing the pulse by the above-described alternation mechanism permits least-cost selection circuit 8 to operate asynchronously, with concomitant speed advantage.

When case IV, V, or VI occurs for one or more decoders 400 after one or more iterations, the A1 outputs related thereto will produce the value of one, and initiate the process described hereinabove in relation to case IV. If case IV does not exist for any decoder 400, each B1 output will be equal to zero, as can be seen by reference to Table 1. In this case, the second member of the cost ordered pair is greater than one, and the above-described decrementation procedure must be applied to this member. Since each B1 output from decoders 400 is applied as an input to its AND gate 510A11-510ANN, if each B1 output is equal to zero, the output of each AND gate 510A11-510ANN along signal paths 511, respectively, will also be equal to zero. Therefore, as seen by reference to FIG. 12, since the output of each AND gate 510 via signal paths 511 is applied as a separate input to OR gate 580, the output of OR gate 580 will also be equal to zero. A value of zero produced by OR gate 580 will be inverted at the input of AND gate 590 of FIG. 16, thereby enabling AND gate 590 to pass the output value of OR gate 550. The inputs to OR gate 550 are the separate B2 outputs of those decoders 400 not disabled by the associated AND gates 520. As indicated previously, the associated AND gates 520 are enabled by outputs of value one from flip-flops 505F11-505FNN only for those switchpoints with cost ordered pairs such that the first member of the ordered pair is minimum. The B2 outputs will be either B1 or $\overline{B1}$, depending upon the T decoder inputs of zero or one, respectively.

Figure 14:
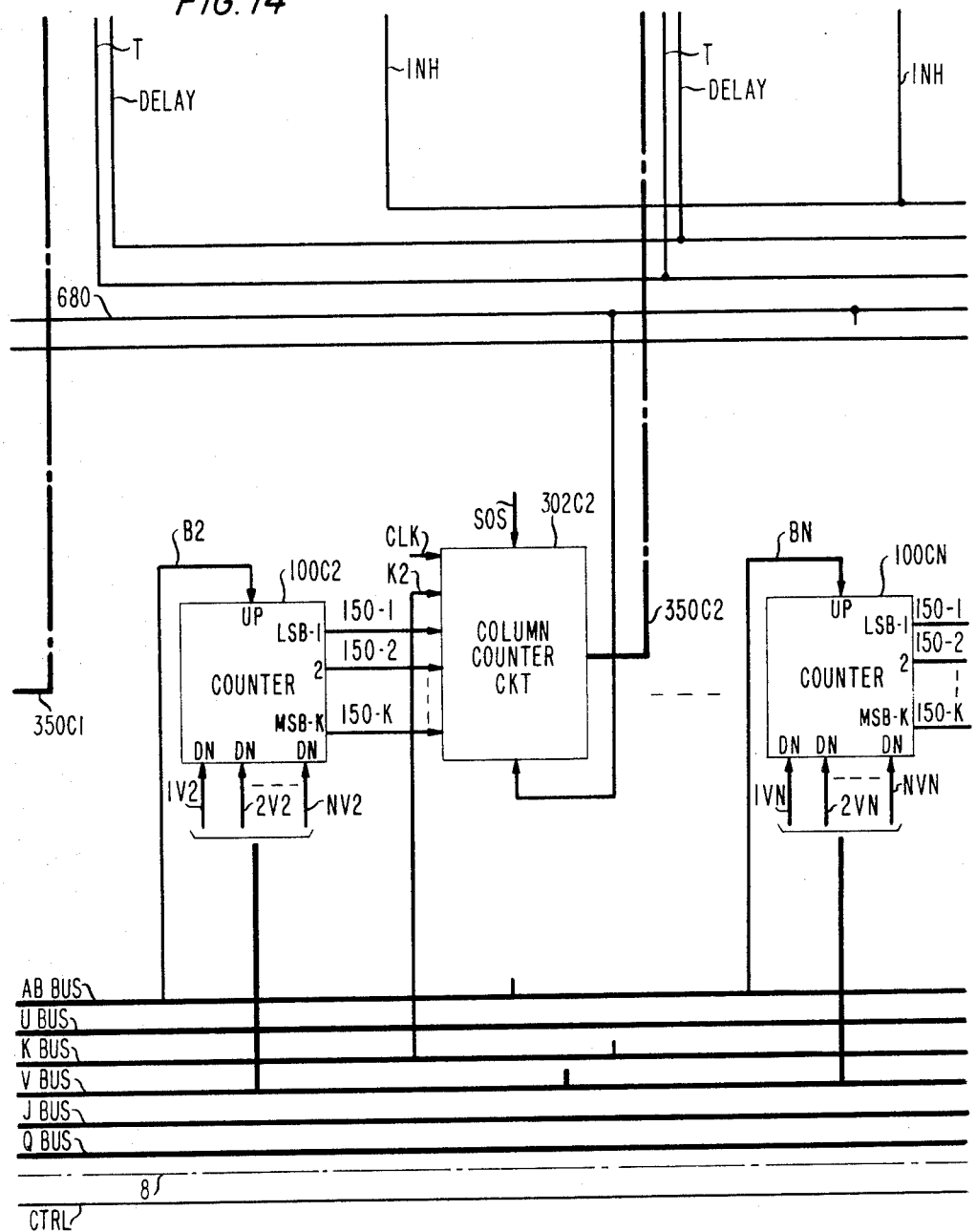

The output of AND gate 590, which will alternate between B1(0) and $\overline{B1}$(1), is subsequently applied as an input to OR gate 600. It should be noted that the other input to OR gate 600 is now zero, since in cases IV, V, and VI, the A1 output is one, which is passed through OR gate 480, and inverted to a zero at input to AND gage 490, causing AND gate 490 to output a zero to signal path 495 and OR gate 600. The above-described decrementation procedure now proceeds with zero and one values alternately supplied through AND gate 590 to OR gate 600, and continues until there is at least one B1 output of one for a decoder 400 with an associated flip-flop 505 set to output the value one. When this occurs, the output of AND gate 510 related thereto will become a one, which will halt the decrementation procedure by disabling AND gate 590. The output of AND gate 510, as seen by reference to FIG. 14, is also applied as an input value of one to selector 700.

During the processing for the second member of the ordered-pair cost, it is possible for a counter 200 to be reduced to one, resulting in one or more A1 decoder outputs of one. However, since AND gate 485 was blocked at the time of processing the first member of the ordered-pair cost, a subsequent A1 decoder output of one cannot propagate beyond AND gate 485. Hence, the associated B1 and B2 decoder outputs are also blocked from reaching selector 700. For example, if the initial costs are A=(1,2), B=(1,3), C=(2,2), and D=(2,3), then the processing of the first member of each ordered pair will select those decoders with associated costs A=(1,2) and B=(1,3). In processing the second member of these ordered pairs, one subtraction is required, resulting in the new values A=(1,1), B=(1,2), C=(1,1) and D=(1,2). Even though pairs C and D now have a first member of one, they are prevented from being selected by the above-described blocking mechanism of AND gate 485.

Referring to FIG. 12, if several AND gates 510A1-1-510ANN have an output of one, the switchpoints related thereto are all in contention to be selected as the least-cost switchpoint, where one of these must now be selected by selector 700 in a manner whereby there is no, or at most negligible, bias for selecting any particular switchpoint in preference to the others. Selector 700 may be a circuit which chooses one of the candidate switchpoints at random, using a hardware uniform random variate generator, such as that designed by A. R. Pratt and discussed in The Radio and Electronic Engineer, Vol. 40, No. 2, August 1970, pp. 83-88. Alternatively, the selection may be made by a circuit which cycles the selection progressively through the switchpoints. At the completion of the selection process, the switchpoint j,k chosen is indicated by outputting the value of one along an output signal path JQK from selector 700, while outputting the value of zero along the remaining $N^2-1$ signal paths 1Q1-NQN from selector 700.

The output signals 1Q1-NQN are fed back to traffic matrix circuit 6, where, as described hereinbefore and seen by reference to FIG. 7, a value of one will function to decrement its associated counter 10 and increment counter 11. The remaining outputs of zero along signal paths 1Q1-NQN will not affect either counters 10 or counters 11. Returning to FIG. 12, the value of 1 propagating along signal path JQK associated with selected switchpoint (j,k) is also applied as an input to a pair of associated registers 307Rj and 307Ck via OR gates 750Rj and 750Ck, respectively, where a plurality of N row registers 307R1-307RN are associated in a one-to-one relationship with the N rows of traffic matrix circuit 6 and a plurality of N column registers 307C1-307CN are associated in a one-to-one relationship with the N columns of the traffic matrix.

An exemplary register circuit is illustrated in detail for register circuit 307R1, where it is to be understood that each register circuit 307R1-307RN, 307C1-307CN comprises identical circuitry. As shown in FIG. 12, output signal paths Q from selector 700 are coupled as separate inputs to an OR gate 750, where paths 1Q1-1QN are coupled as inputs to an OR gate 750R1 of row register 307R1, and so on, where signal paths NQ1-NQN are coupled as inputs to an OR gate 750RN of row register 307RN. Similarly, signal paths 1Q1-NQ1 are coupled as inputs to an OR gate 750C1 of column register 307C1, and so on, where signal paths NQ1-NQN are coupled as inputs to an OR gate 750CN of column register 307CN. If any of the inputs to OR gate 750 is equal to one, the output of OR gate 750 will also be equal to one, indicating that a selection has been made. Thus, for row register circuits 307R1-307RN, the outputs from OR gates 750R1-750RN will be the values of J1-JN, respectively. Similarly, for column register circuits 307C1-307CN, the outputs from OR gates 750C1-750CN will be the values of K1-KN, respectively.

After a switchpoint is selected, a test is made to determine if any more switchpoints are to be selected, as described further below. In the case that another switchpoint is to be selected, several actions are required prior to the selection. First of all, it is necessary to prevent any subsequent selection in the row or column of the chosen switchpoint. This is accomplished by feeding back the outputs of OR gates 750R1-750RN, 750C1-750CN, which are J1-JN, K1-KN, respectively, back to their associated flip-flops 290R1-290RN, 290C1-290CN, as illustrated in FIG. 9 for flip-flop of row counter circuit 302P1. Therefore, a value of one produced by Or gates 750Rj and 750Ck will feed back to and trigger their associated flip-flops 290Rj and 290Ck to output a zero, thereby blocking the decoders associated therewith, as described hereinbefore. A value of zero applied as an input to the remaining flip-flops 290R1-290RN, 290C1-290CN will not alter the outputs therefrom, thereby allowing the decoders 400 associated therewith to remain active. Also, as described hereinbefore, when circuits are being assigned, the J1-JN, K1-KN outputs of OR gates 750R1-750RN, 750C1-750CN from least-cost selection circuit 8 are fed back to traffic matrix circuit 6 to update shift registers 60. The J1-JN, K1-KN outputs are also fed back to controller 4, which stores the indicated row and column of the selected switchpoint, pending subsequent broadcasting to the ground of the entire switch schedule.

Another function required after a switchpoint is selected is to update the row and column sums in counters 100R1-100RN, 100C1-100CN. This could be accomplished by recomputing the row and column sums by again operating traffic matrix circuit 6. However, this would require N clock cycles. A faster way to achieve this is to adjust the existing row and column sums in counters 100R1–100RN, 100C1–100CN. For example, if switchpoint 2,3 is chosen, and there is, for example, a one in row 2, column 4 of the binary traffic matrix, then that one in column 4 is voided by the selection of switchpoint 2, 3, and a one must be subtracted from the column 4 sum. Similarly, if there is, for example, a one in row 5, column 3, then that one in row 5 is voided, and a one must be subtracted from the row 5 sum. These subtractions may be made using a plurality of 2N register circuits 307R1–307RN, 307C1–307CN which contain two copies of the binary traffic matrix, a row order copy stored in register circuits 307R1–307RN and a column order copy in register circuits 307C1–307CN as set by signals generated along signal paths A1–AN, B1–BN in traffic matrix circuit 6 described hereinabove.

As seen by reference to FIG. 12, the N separate serial outputs from an exemplary shift register 800 included in register circuit 307R1 are applied as separate inputs to a plurality of N AND gates 850. When an exemplary switchpoint 1,1 is selected by selector 700, the output of OR gate 750R1 becomes a one, thus enabling AND gates 850 and allowing the separate row 1 bits (for columns 1 through N) from the associated shift register 800 to appear at the separate outputs of the associated N AND gates 850 onto signal paths 1V1–1VN as the output of row register 307R1, as seen by reference to FIG. 12. Each separate bit appearing along the plurality of N output paths 1V1–1VN is subsequently applied as an input to the decrement input of a separate one of the associated column counters 100C1–100CN of FIGS. 13 and 14. Similarly, selection of switchpoint 1,1 causes the output of OR gate 750C1 to become a one, thus enabling the column 1 bits (for rows one through N) from its associated shift register 800 to appear as separate outputs of the associated N AND gates 850 onto signal paths 1U1–1UN as the output of column register circuit 307C1, as seen by reference to FIG. 12. Each separate bit appearing along the plurality of N output paths 1U1–1UN is subsequently applied as the decrement input of a separate one of the associated row counters 100R1–100RN of FIG. 9.

As seen by reference to FIG. 12, the output of each OR gate 750C1–750CN along signal paths 756 is also applied as an input to an OR gate 900. Therefore, upon selection of a switchpoint, a value of one will appear at the output of OR gate 900, where the output of OR gate 900 is applied as an input to and functions to increment a counter 910 of FIG. 15. At the start of the assignment process for a slot, counter 910 is initialized by controller 4 with the number of ongoing circuits in the current slot. Therefore, since counter 910 is incremented with each new switchpoint assigned, it will always contain the current number of switchpoints assigned in the slot. A register 912 illustrated in FIG. 15 is loaded by controller 4 and contains the maximum number of closed switchpoints allowable for such traffic in a slot, which is equal to the number of active transponders. A comparator 915 is responsive to the output of both counter 910 and registers 912 and functions to compare the current number of switchpoints assigned in a slot to the maximum allowable. When the number assigned becomes equal to this maximum, comparator 915 outputs a value of one to signal path 916, and subsequently to controller 4 to terminate the operation of least-cost selection circuit 8.

The output of OR gate 900 also feeds to counter 920 of FIG. 15. At the start of the assignment process for a frame, controller 4 loads counter 920 with the total number of all switchpoints assigned in all slots of the frame for ongoing circuits. When packets are being assigned controller 4 disables counter 920 from being incremented. When circuits are being assigned controller 4 enables a signal of value one from OR gate 900 to increment counter 920, which accordingly contains at any given time the total number of all switchpoints in all slots assigned to circuits. Also at the start of a frame, controller 4 loads a register 922 with a value equal to the maximum number of switchpoints allowable in all slots of the frame for circuits. A comparator 925 has as separate inputs the contents of both counter 920 and register 922. When packets are being assigned, controller 4 disables comparator 925 and furthermore causes comparator 925 to output a value of zero. When circuits are being assigned, controller 4 enables comparator 925 which functions to compare the current total number of switchpoints assigned in all slots of the frame for circuits in counter 920 with the maximum allowable in register 922. When the number assigned becomes equal to the maximum allowable, comparator 925 outputs a one onto signal path 926, and subsequently to controller 4, which then functions to terminate the current operation of least-cost selection circuit 8, and to terminate operation of traffic matrix circuit 6 and least-cost selection circuit 8 for circuit assignments in all remaining slots in the frame, although operation for packet assignments continues until all slots have been processed. The mechanism consisting of counter 920, register 922 and comparator 925 comprises the second part of the implementation of the movable-boundary protocol hereinbefore described. This second part differs from the first, which consists of counters 11, registers 12 and comparators 13, in that the limits for the first part apply separately for each switchpoint, whereas the limit for the second part applies to the totality of switchpoints assigned for circuits. In general, the limit for circuits including all switchpoints is expected to be reached before any of the limits for individual switchpoints.

The output of comparator 915 on signal path 916 and the output of comparator 925 on signal path 926 also feed to an OR gate 935. If neither the limit in register 912 nor the limit in register 922 is reached, both inputs to OR gate 935 are zero, resulting in an output of zero, which is thereafter applied as an input to an inverter 940 illustrated in FIG. 16 which will subsequently output a value of one. The output of inverter 940 is then applied as an input to an AND gate 950, where the second input to AND gate 950, as seen by reference to FIG. 16, is the output of OR gate 900. The output of AND gate 950, therefore, will be equel to the value one only when the output of OR gate 900 is equal to one, i.e., when a new switchpoint is selected, and when the outputs of comparators 915 and 925 are both equal to zero, i.e., when there are remaining switchpoints to be selected. The output of one from AND gate 950 is subsequently applied as an input to a pair of delay units 970 and 980. After the required delays, the output from delay units 970 and 980 are subsequently applied as inputs to a pair of OR gates 975 and 985, respectively. The output of OR gate 975 becomes the start-of-switchpoint, or SOS signal, and the output of OR gate 985 becomes the delayed start-of-switchpoint or SOS' signal. The delay provided by delay unit 970 must be long enough to permit decrementation of counters 100R1–100RN, 100C1–100CN, as described above, before initiating the loading of counters 200R1–200RN, 200C1–200CN. The delay provided by delay unit 980 must be long enough to permit the decrementation of counters 100R1–100RN, 100C1–100CN, the loading of counters 200R1–200RN, 200C1–200CN, the setting of flip-flops 290R1–290RN, 290C1–290CN, and the initializing functions of the SOS signal, prior to strobing decoders 400 to enter the input values. The SOS and SOS' signals required prior to the first switchpoint assignment are provided by controller 4 via OR gates 975 and 985. The SOS signal is also fed back to traffic circuit matrix 6, as previously described.

What is claimed is:

1. A method of assigning both circuit and packet traffic requests between grouped pairs of a plurality of N ground zones of a satellite communication system to each of a plurality of concurrent and synchronized satellite-switched time division multiple access (SS/TDMA) frame sequences, each frame sequence comprising M sequential time slots, the method comprising the steps of:

a. representing the circuit traffic requests by an N×N circuit traffic matrix ($[c_{i,j}]$) where an individual element ($c_{i,j}$) represents a total number of requests for circuit traffic from a first ground zone i to a second ground zone j;

b. representing the packet traffic requests by an N×N packet traffic matrix ($[p_{i,j}]$) where an individual element ($p_{i,j}$) represents a total number of requests for packet traffic from a first ground zone i to a second ground zone j;

c. representing a plurality of ongoing circuits continuing from a previous time frame into a present time frame by M N×N matrices ($[o_{i,j}]$) where an individual element ($o_{i,j}$) in a $K^{th}$ matrix represents the presence or absence of an ongoing circuit from zone i to zone j in time slot K;

d. representing circuit assignments by M N×N circuit assignment matrices and packet assignments by M N×N packet assignment matrixes ($[t_{i,j}]$) where an individual element ($t_{i,j}$) in the $K^{th}$ assignment matrix represents the presence or absence of a scheduled interconnection between a first ground zone i and a second ground zone j in slot K;

e. forming for the current slot being assigned an N×N binary matrix ($[c'_{i,j}]$) by setting each element ($c'_{i,j}$) to the value one if both the element ($c_{i,j}$) in the circuit traffic matrix formed in step (a) is nonzero and there is no element of value one in row i or column j of the ongoing circuits matrix for the current slot as formed in step (c), and by setting all other elements of the binary matrix to zero;

f. forming for the current slot being assigned, a row sum ($R_i$) for each row in the binary matrix formed in step (e) and a column sum ($C_j$) for each column in said binary matrix, wherein the row sum is the sum of the element values in the row and is also the number of nonzero elements in said row, and the column sum is the sum of the element values in the column and is also the number of nonzero elements in said column;

g. forming for each new slot to be assigned, an N×N cost matrix ($[c''_{i,j}]$) wherein each element ($c''_{i,j}$) is an ordered pair comprising a first member less than or equal to a second member such that if an element ($c'_{i,j}$) of said binary matrix formed in step (f) is zero, said first and second members of said ordered pair related thereto are both equal to zero, and if an element ($c'_{i,j}$) of said binary matrix formed in step (f) is nonzero, said first member of said ordered pair is equal to the lesser of said row sum and said column sum formed in step (f) related thereto and said second member of said ordered pair is equal to the greater of said row and column sums;

h. determining a row i and a column j of a least-cost element in the cost matrix formed in step (g), wherein the least-cost element is an ordered pair such that a first member thereof is less than or equal to the first member of all nonzero ordered-pair elements in said cost matrix, and such that the second member thereof is less than or equal to the second member of all nonzero ordered pairs with a least first member;

i. assigning a least-cost switchpoint (i,j) in the current slot to a circuit, by setting to one the element at row i and column j of that circuit assignment matrix for the current slot, wherein said row i and said column j are those determined in step (h);

j. updating the row sums and the column sums formed in step (f), wherein a row sum is reduced by one if the row of said binary matrix related thereto contained a value of one in the column of the switchpoint determined in step (i); and a column sum is reduced by one if the column of said binary matrix related thereto contained a value of one, in the row of the switchpoint determined in step (i);

k. updating said binary matrix formed in step (e) by setting to zero each element in the row i and the column j of said binary matrix chosen in step (h);

l. obtaining any remaining assignments for the current slot by reiterating steps (g)–(k) until said binary circuit matrix comprises only zero valued elements, or the number of circuit assignments made in the current slot equals a predetermined limit, or the total number of circuit assignments made in all slots in the current frame equals a predetermined limit;

m. updating the ongoing circuits matrix for the current slot by entering a one at each position (i,j) of the matrix for each new circuit assigned in the current slot determined in step (h);

n. assigning packets for the current slot by reiterating steps (e)–(l) wherein in step (e) the packet traffic matrix is accessed instead of the circuit traffic matrix, and wherein in step (i) the packet assignment matrix is accessed instead of the circuit assignment matrix, and wherein in step (l) references are to packet assignments instead of circuit assignments;

o. updating the circuit traffic matrix by subtracting one from each position of the circuit traffic matrix for which there is a one in the corresponding position of the circuit assignment matrix for the current slot;

p. updating the packet traffic matrix by subtracting one from each position of the packet traffic matrix for which there is a one in the corresponding position of the packet assignment matrix for the current slot;

q. obtaining assignments for any remaining slots in the current frame by reiterating steps (e)–(p) until all M slots are scheduled, or both the circuit traffic matrix and the packet traffic matrix have only zero valued elements as determined in step (l), or the predetermined limits on both the total number of circuit assignments and the total number of packet assignments in a frame have been reached, as determined in step (l); and r. accessing by a controller of the circuit assignment matrices for the M slots of a frame and of the packet assignment matrices for the M slots of the frame, as assigned in step (i), for broadcasting the assignment schedule to the ground and configuring an interconnection in accordance with the assignment schedule, resetting both the circuit and packet assignments matrices thereafter, and setting to zero positions within the matrices corresponding to circuits which had been assigned and were ongoing, but have now terminated, and deducting blocked circuit requests from the circuit traffic matrix and adding newly arrived demand to the circuit and packet traffic matrices.

2. The method according to claim 1 wherein the method comprises the further steps of
s. in performimg step (h) performing the steps of
1. comparing the value of a first ordered pair of the cost matrix to the value of a second ordered pair of the cost matrix;
2. retaining the smaller value ordered pair;
3. comparing the result of step (s) (2) to a subsequent ordered pair from the least-cost traffic matrix; and
4. reiterating steps (s) (2) and (s) (3) $N^2-1$ times.

3. An onboard satellite switching system responsive to both circuit transmission requests and packet transmission requests from a plurality of N separate ground zones for assigning both said circuit and packet requests in each succeeding time slot of a plurality of time slots forming a single time frame, thereby likewise continuously assigning circuit and packet requests in each subsequent time frame, said satellite switching system comprising a controller (4) responsive to said circuit and packet requests on a frame-by-frame basis for first initializing and subsequently terminating the assignment of circuit transmission requests and second initializing and subsequently terminating the assignment of packet transmission requests in each time slot of said single time frame, said controller repeating said initializing and terminating for subsequent time slots forming subsequent time frames;

a traffic matrix circuit (6) responsive first to said circuit transmission requests and a plurality of ongoing circuit matrices from said controller for formimg a cost matrix related thereto and responsive second to said packet transmission requests from said controller for forming a cost matrix related thereto; and a least-cost selection circuit (8) responsive first to the cost matrix formed in relation to said circuit transmission requests for selecting a least-cost circuit assignment and using said least-cost circuit assignment to update the cost matrix and relaying said least-cost circuit assignment back to said traffic matrix circuit to be used in updating the circuit traffic matrix and one of a plurality of ongoing circuit matrices, and responsive second to the cost matrix formed in relation to said packet transmission requests for selecting a least-cost packet assignment and using said least-cost packet assignment to update the cost matrix and relaying said least-cost packet assignment back to said traffic matrix circuit to be used in updating the packet traffic matrix.

4. An onboard satellite switching system formed in accordance with claim 3 wherein
the traffic matrix circuit comprises a plurality of $N^2$ binary counters (10) capable of being arranged to form a plurality of N rows and a plurality of N columns, each counter associated with a separate and distinct transmission connection between a pair of ground zones from the plurality of N ground zones, said plurality of $N^2$ binary counters thereby forming a traffic demand matrix;

a plurality of M sets of N row shift registers (103), with each of the M sets referring to a separate one of the M time slots in a frame, and with each row shift register associated with a separate row of said traffic demand matrix and containing the locations of circuits that have been assigned or ongoing but not yet terminated;

a plurality of M sets of N column shift registers (102), with each of the M sets referring to a separate one of the M time slots in a frame, and with each column shift register associated with a separate column of said traffic demand matrix and containing the switch locations of circuits that have been assigned or ongoing but not yet terminated;

a plurality of N row multiplexers (20M1–20MN), each row multiplexer associated with a separate row of said traffic demand matrix for selecting on each of N successive clock cycles N of the counters (10) such that on clock cycle L the counters in column L of the traffic demand matrix are selected and connected to the plurality of row multiplexers associated therewith, and such that each row multiplexer and a shift register associated therewith are employed to void a counter signal if a switchpoint associated therewith is in the row or column of an ongoing circuit, or provide enabling signals to the least-cost selection circuit if no ongoing circuit is present;

a plurality of N demultiplexers (30), each demultiplexer associated with a separate plurality of row multiplexers to distribute a plurality of signals to the least-cost selection circuit to prevent the selection of a switchpoint which has zero traffic demand;

a plurality of N column multiplexers (22M1–22MN), each column multiplexer associated with a separate column of said traffic demand matrix for selection on each of N successive clock cycles N of the counters (10) such that on clock cycle L the counters in row L of the traffic demand matrix are selected and connected to the plurality of column multiplexers associated therewith, and such that each column multiplexer and a shift register associated therewith are employed to void a counter signal if a switchpoint associated therewith is in the row or column of an ongoing circuit, or provide enabling signals to the least-cost selection circuit if no ongoing circuit is present.

5. An onboard satellite switching system formed in accordance with claim 4 wherein
each binary down counter (10) further comprises a movable boundary circuit (11, 12, 13) for disabling the circuit transmission request output from said binary counter when a predetermined circuit traffic limit is obtained.

6. An onboard satellite switching system formed in accordance with claims 3 or 4 wherein
the least-cost selection circuit comprises
a plurality of N row counters (100R1–100RN), each row counter responsive to the values of a separate row transmitted by the traffic matrix circuit for containing said row sum value therein;

a plurality of N binary column counters (100C1–100CN), each representative column counter responsive to the values of a separate column transmitted by the traffic matrix circuit for containing said column sum value therein;

a plurality of N row binary down counters (200), initially loaded with the row sums in the row counters and decremented, if necessary, by one iteratively until at least one nonzero ordered pair cost in said cost matrix has a first member equal to the value one and, if necessary, decremented by one iteratively until at least one of the ordered-pair costs with a first member equal to one also has a second member equal to one;

a plurality of N column binary down counters (200), initially loaded with the column sums in the column counters and decremented, if necessary, by one iteratively until at least one nonzero ordered-pair cost in said cost matrix has a first member equal to the value one and, if necessary, decremented by one iteratively until at least one of the ordered-pair costs with a first member equal to one also has a second member equal to one;

a plurality of $N^2$ decoders (400), each decoder responsive to a separate one of said plurality of N row binary down counters and a separate one of said plurality of N column binary down counters for identifying those switchpoints of least-cost by identifying first those switchpoints with the smallest first member of the ordered-pair cost, and then among those with the smallest first member identifying those with the smallest second member of the ordered-pair cost, and producing signals on $N^2$ output lines corresponding to the $N^2$ switchpoints such that those lines corresponding to switchpoints of least-cost carry the value of one, and the remaining lines carry a value of zero;

a selector (700) responsive to said $N^2$ output pairs of cost values from said plurality of $N^2$ decoders for selecting one of the switchpoints with least cost by a selection means wherein selection is cycled through the switchpoints progressively or randomly on successive operations of the selector; and termination means (910, 912, 915) responsive to the least-cost assignment output of said selector for counting the number of least-cost assignments made in a slot and transmitting a first terminate signal to the controller when a predetermined number of assignments in a slot have been completed and termination means (920, 922, 925) responsive to the least-cost assignment output of said selector for counting the number of circuit assignments made in a frame and transmitting a second terminate signal to said controller when a predetermined number of circuit assignments have been completed.

* * * * *